US006823170B1

(12) United States Patent
Dent

(10) Patent No.: US 6,823,170 B1
(45) Date of Patent: Nov. 23, 2004

(54) SATELLITE COMMUNICATIONS SYSTEM USING MULTIPLE EARTH STATIONS

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 449 days.

(21) Appl. No.: 09/616,637

(22) Filed: Jul. 26, 2000

(51) Int. Cl.⁷ ............................................. H04B 7/185
(52) U.S. Cl. ..................... 455/13.3; 455/430; 370/316; 342/368
(58) Field of Search .............................. 455/13.3, 12.1, 455/427, 430; 370/316; 342/368, 373

(56) References Cited

U.S. PATENT DOCUMENTS

| | | | |
|---|---|---|---|
| 4,218,654 A | | 8/1980 | Ogawa et al. |
| 5,533,023 A | * | 7/1996 | Ohlson et al. ............. 370/69.1 |
| 5,691,727 A | | 11/1997 | Cyzs |
| 5,966,102 A | * | 10/1999 | Runyon ....................... 343/820 |
| 6,005,515 A | | 12/1999 | Allen et al. |

FOREIGN PATENT DOCUMENTS

EP 0877444 A1 11/1998

* cited by examiner

*Primary Examiner*—Lee Nguyen
(74) *Attorney, Agent, or Firm*—Coats & Bennett, P.L.L.C.

(57) ABSTRACT

A satellite communications system uses multiple ground stations and one or more satellites for communicating between mobile subscribers and a land-based communications network, such as the PSTN or the Internet. Multiple ground stations geographically dispersed minimize toll charges incurred routing calls from a mobile subscriber through the land network by reducing the need for long-distance calling. Further, because each ground station communicates with a given satellite using the same frequency spectrum, the subscriber capacity of the system increases and/or bandwidth requirements for the communications link between ground stations and satellites may be reduced. The present system uses ground-based beamforming techniques enabling each satellite to transmit signals in multiple transmission beams, each beam supporting one or more mobile subscribers. Each beam may reuse the same frequency spectrum, thereby increasing the number of subscribers supported by each satellite. Multiple ground stations cooperatively relay signals through a given satellite in a manner complementary with ground-based beamforming.

35 Claims, 12 Drawing Sheets

SATELLITE COMMUNICATIONS SYSTEM USING MULTIPLE EARTH STATIONS

BACKGROUND OF THE INVENTION

The invention relates to satellite communications systems, and more particularly, to such systems for communicating between mobile subscribers and at least two ground stations connected to a communications network such as the Public Switched Telephone Network (PSTN) or the Internet.

It is known to communicate between a plurality of mobile terminals and a central ground station via an orbiting relay satellite using multiple transmission and reception beams between the satellite and the mobile terminals, while locating the processing for controlling the multiple beams, known as an adaptive beamformer, at the central station rather than on board the satellite. A considerable reduction in complexity of the orbiting satellite results when practicing this art. The technique relies upon communication of multiple signals between the central ground station and the satellite in such a way that their relative phase and amplitude, i.e. coherency, is preserved. One coherent transmission scheme is to sample each of the multiple signals at or above the Nyquist rate and then to form a-high speed time-multiplex of the sampled signals. Known signals may be included in the time-multiplexed stream for facilitating time and frequency synchronization at the satellite.

The reverse link from satellite to central station also preferably uses a high speed time-multiplex of signals received at the satellite by different elements of a multi-element antenna to preserve relative coherency, thus permitting ground-based beamforming for reception as well as transmission. Relative coherency is preserved by time multiplexing through the use of a first time multiplexer for time-multiplexing the real (Inphase or I) parts of a sampled complex signal waveform and a second time-multiplexer, synchronized with the first time-multiplexer, for time-multiplexing the corresponding imaginary (Quadrature or Q) parts of the sampled complex signal waveform, which technique will be referred to as quadrature time division multiplexing.

Mayfield et al., in U.S. Pat. No. 5,903,549 entitled "Ground based beamforming utilizing synchronized code division multiplexing" teaches using CDMA feeder link transmission to maintain the desired coherency between antenna array element signals, and the '549 patent is incorporated by reference herein.

In prior art systems, a single central station (ground station) relays signals through one or more satellites, thereby providing service to a number of mobile terminals. However, using a single ground station is not optimal in certain communication systems. Because one or more satellites provide coverage over a significant geographic area, a single ground station may be geographically distant from the end destination of a mobile terminals user's call. Thus, the routing of the call from the ground station to the end destination may be subject to long-distance charges. Multiple ground stations arranged with sufficient geographic separation minimizes the maximum toll charges required to complete a given mobile terminal user's call.

A further disadvantage arises from frequency re-use limitations inherent in single-ground station systems. Multiple ground stations that are sufficiently separated geographically may reuse the same frequency spectrum to communicate with the one or more satellites. This is possible because the satellites can easily distinguish between multiple signals in the same frequency spectrum provided there is adequate spatial diversity between the originating signal sources.

However, there remains a need for a communications system in which multiple ground stations advantageously arranged in a given geographic region and each employing beamforming techniques can cooperatively relay signals through one or more supporting satellites to a plurality of mobile terminal users.

SUMMARY OF THE INVENTION

The present invention meets this and other needs by providing methods and apparatus for enabling such a communications system. A communications satellite system according to the present invention uses one or more satellites to relay information between a large number of mobile terminals distributed over one or more service regions and a smaller number of ground stations connected to the PSTN or Internet. Beamforming techniques are used such that each satellite transmits a plurality of transmission beams, thereby increasing the number of users supported by each satellite.

The present invention provides both methods and apparatus that permit multiple ground stations to cooperatively relay signals through individual satellites in a manner complementary to the ground-based beamforming techniques used. In a first embodiment of the present invention, different ground stations have control over all the bandwidth in a subset of the transmission beams. In a second embodiment, different ground stations have control over a different portion of the bandwidth but are allowed to use that portion of the bandwidth in any transmission direction. In a third embodiment all ground stations have control over all bandwidth in any transmission direction, but act to avoid interference by not using the same bandwidth in overlapping beams or neighboring directions.

Digital beamforming provides a way to combine and process a plurality of signals for output to a multi-element antenna array in a manner that results in the antenna array outputting one or more directional beams. Both the direction and signal content for each individual beam may be controlled simply through altering the linear combination of the plurality of signals input to the beamforming apparatus. The input signals to the digital beamformer each comprise a stream of complex values and the beamformer combines these input signal streams by performing a series of matrix operations that results in each antenna element radiating a signal representative of a potentially different vector combination of the input signals. By adjusting the set of coefficients applied to the input signals, the digital beamformer can dynamically change the direction and content for any or all of the beams output by antenna array. Because of the directional nature of the output beams, each beam may reuse the same frequency spectrum. Thus, digital beamforming techniques allow a substantial increase in the number of mobile terminal users that may be supported over a given service area by a given satellite.

In ground-based beamforming, the digital beamformer resides in a ground station, processing its plurality of input signals and outputting a set of vectors that will produce the desired beams when input to an appropriate multi-element antenna array. The output vector set is transmitted to a satellite, and systems on-board the satellite feed these vectors to such an antenna array, thereby producing the desired set of transmission beams for coverage of a given service area. Ground-based digital beamforming simplifies the design of the satellite but introduces complications when more than one ground station, each employing ground-based beamforming techniques, relays signals through the same satellite. As noted, the system of the present invention provides methods and apparatus for multiple beam-forming ground stations to relay information through the same satellite in an advantageous manner.

A communications satellite system according to the present invention relays information between a large number of mobile subscribers distributed over a service region and a smaller number of ground stations connected to the PSTN or Internet. The ground stations receive signals from the PSTN or Internet to be relayed to the mobile subscribers via the satellite. The ground stations encode and modulate the signals and form the signals into array element drive signals using a beamformer. The array element drive signals are then multiplexed and translated to a feeder link uplink frequency for transmission to the satellite. More than one ground station transmits to the satellite in the same feeder link frequency band so that the satellite receives the sum of the overlapping ground station signals. The satellite synchronizes to known signal patterns included in the ground station signals and transmits misalignment information to permit ground stations to align their timing and frequency references.

The satellite receives signals from the ground stations using a feeder link receive antenna and divides the feeder link signals into array drive signals and synchronizing signals. The synchronizing signals are processed to derive the aforementioned misalignment information. The array drive signals are modulated to the satellite-to-mobile (i.e. communications downlink) frequency band (e.g. S-band) and amplified by a matrix of S-band power amplifiers to drive a multi-element transmit array so as to create multiple transmission beams directed to mobile subscribers in different cells of the service region. Different ground stations create beams that are separated in the spatial dimension, the frequency dimension, or the time dimension so as to avoid mutual interference.

According to the invention, all ground stations may transmit to the satellite in the same feeder link spectrum and the satellite thus receives a linearly additive combination of signals from all ground stations. The characteristics of each signal are however chosen and generated at each of the ground stations so that the signals from the different ground stations translate to different S-band beams, different S-band frequencies, or different TDMA timeslots (or any combination of these three differences), thus avoiding interference on the S-band downlink between signals originating from different ground stations and destined for different mobile subscribers.

Conversely, signals are received at the satellite from mobile subscribers using a multiplexed element array antenna and after amplification and filtering, the received signals are multiplexed and frequency-translated to a feeder downlink frequency and transponded to the ground stations. The ground stations receive and demultiplex the multi-element array signals transponded from the satellite and digitize the signals for numerical processing. Numerical processing includes digital channelization to divide the signals into a number of frequency channels by means of digital filtering or Fourier Transformation, and digital beamforming to enhance signals received at the satellite from particular directions corresponding to subscribers lying in cells of the service region and served by a given ground station. The ground stations then decode the subscriber signals they are assigned to handle and couple the signals to the PSTN or Internet.

DETAILED DESCRIPTION OF THE INVENTION

Figure 1:
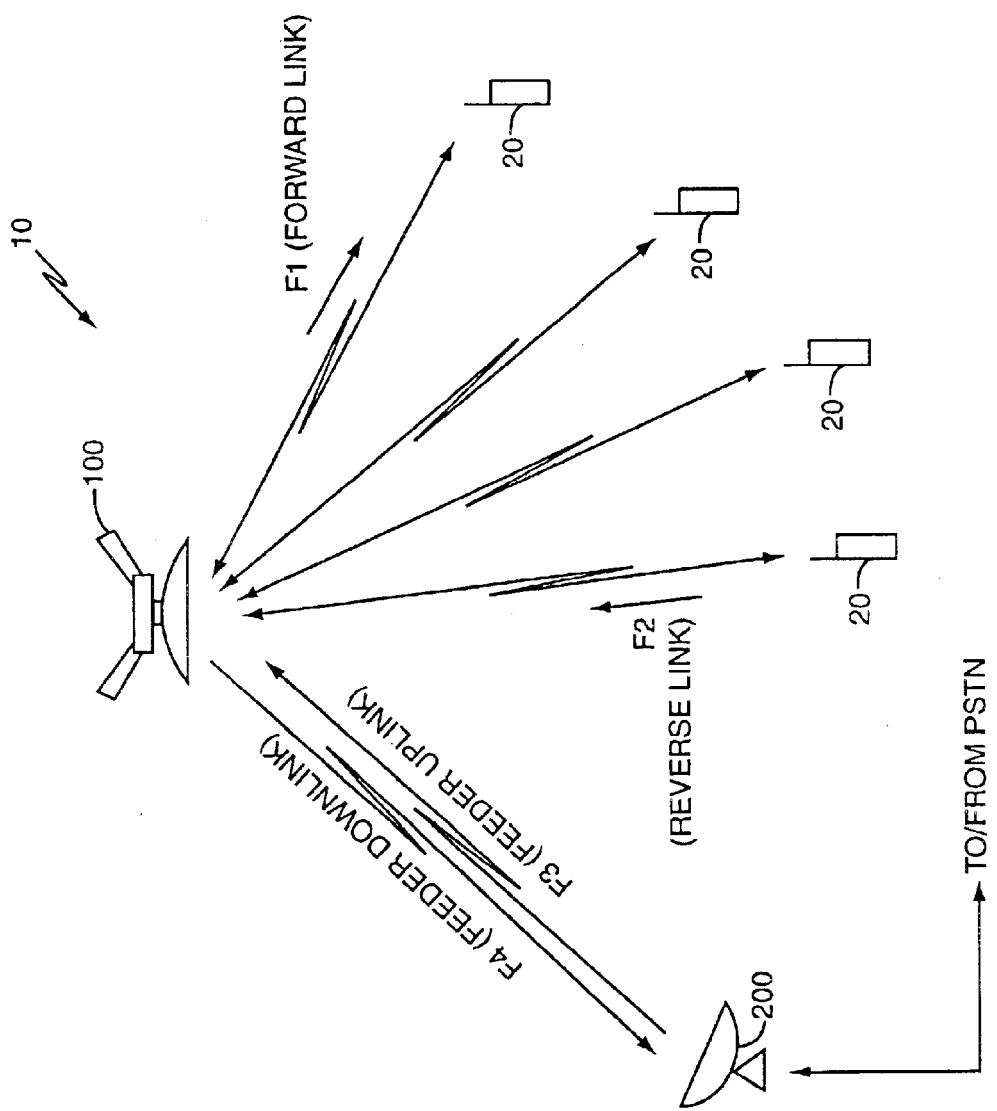
FIG. 1 illustrates a mobile satellite communications system according to an aspect of the present invention.

FIG. 1 shows a mobile satellite communication system, generally indicated by the numeral 10. Mobile satellite communication system 10 includes a plurality of mobile terminals 20 that communicate via satellite 100 with one or more ground stations 200. Ground stations 200 enable mobile terminals 20 within the mobile satellite communication system 10 to communicate with persons connected to terrestrial networks, such as the Public Switched Telephone Network (PSTN) or the Internet, in the latter case possibly using IP routing. Signals are relayed between the mobile terminals 20 and the PSTN (or Internet) via satellite 100 and ground station 200. The satellite 100 receives signals from the ground station 200 on the feeder uplink frequency band F3 and translates them to the satellite-to-mobile link frequency band F1, also known as the Forward Link or the communications downlink. Conversely, the satellite 100 receives signals from the mobile terminals 20 on the communications uplink band F2, also known as the Reverse Link, and translates them to the feeder downlink frequency band F4 for transmission to ground stations 200.

The current invention is related to and a development of the following prior issued U.S. patents to Applicant: U.S. Pat. No. 5,848,060 Cellular/satellite communications system with improved frequency re-use; U.S. Pat. No. 5,812,947 Cellular/satellite communications systems with improved frequency re-use; U.S. Pat. No. 5,642,358 Multiple beam width phased array; U.S. Pat. No. 5,631,898 Cellular/satellite communications system with improved frequency re-use; U.S. Pat. No. 5,619,503 Cellular/satellite communications system with improved frequency re-use; U.S. Pat. No. 5,619,210 Large phased-array communications satellite; U.S. Pat. No. 5,594,941 A cellular/satellite communications system with generation of a plurality of sets of intersecting antenna beams; and U.S. Pat. No. 5,555,257 Cellular/satellite communications system with improved frequency re-use. All of the above are hereby incorporated by reference herein.

As described in these references, communication between mobile terminals 20 and the satellite 100 comprises dividing the service region into a number of cells, or beams, using a of multi-element antenna array on the satellite 100 to form directional beams. The purpose of the directional beams used on the forward and reverse links F1 band F2 is twofold: (a) to increase the satellite antenna gain and thereby reduce the radio-frequency power needed to support each link, and (b) to enable channel frequencies in the forward and reverse links F1 and F2 to be reused in different beams with low probability of interference, thus conserving spectral efficiency. As also described in the incorporated references, maximum frequency re-use and thereby maximum spectral efficiency is achieved when adaptive beamforming is employed, allowing effectively one beam per mobile terminal 20 that is optimized for each mobile terminal user. Optimization of each beam entails adapting a set of coefficients to maximize the ratio of wanted signal to noise plus unwanted signals received at each mobile terminal 20 from the satellite 100 and conversely to maximize the quality of each mobile signal decoded at ground stations 200.

Prior to the disclosures of the incorporated references, adaptive beamforming, if used, was only known to be located on board the satellite 100, which required significant processing equipment massing many kilograms and consuming many hundred watts of electrical power. As such, beamforming in the satellite has significant disadvantages. When practicing the art of Applicant's herein-incorporated patents however, the processing for adaptive beamforming may be transferred to the ground.

Figure 2:
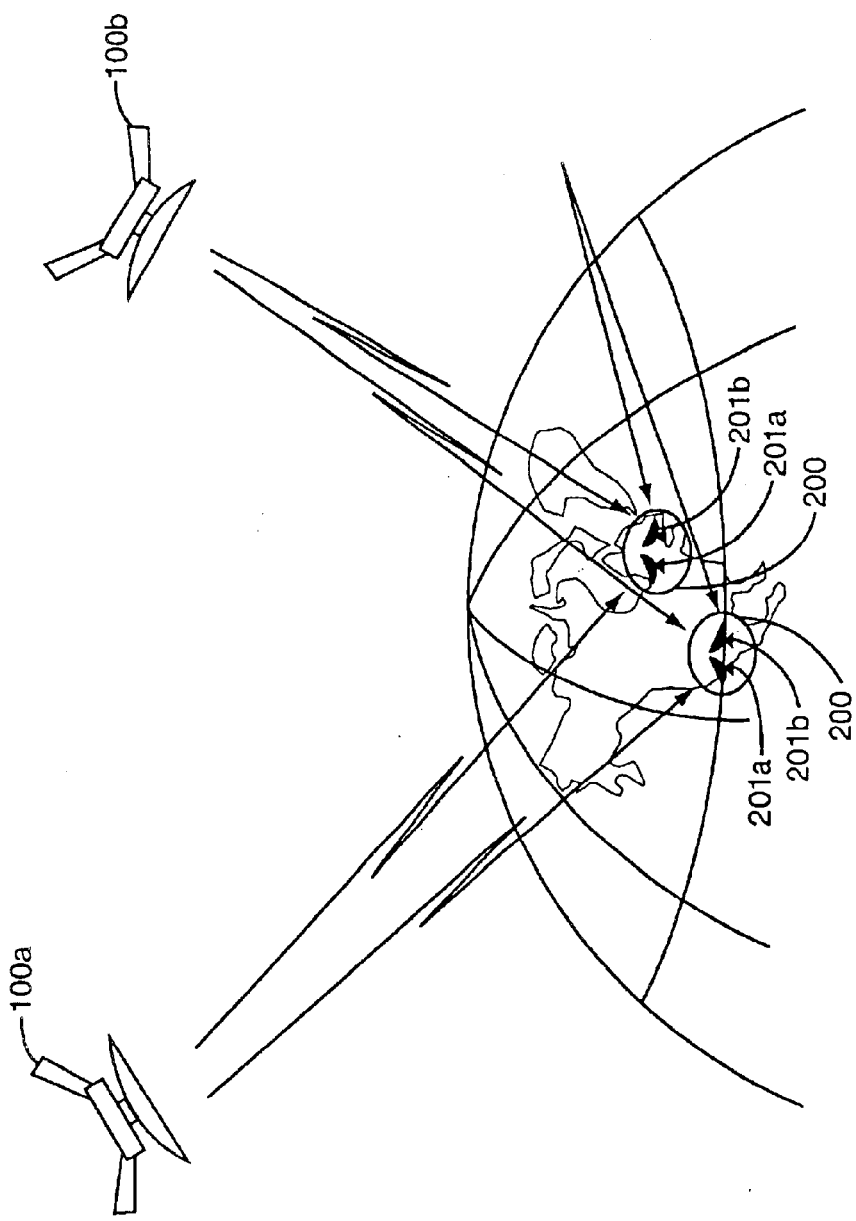
FIG. 2 illustrates another mobile satellite communications system according to another aspect of the present invention.

FIG. 2 illustrates a mobile satellite communication system 10 for the United States. Two satellites 100a and 100b are used to provide good coverage of mobile terminal service regions from the west coast to the east coast, the satellites being designated the west coast Satellite 100a and the east coast satellite 100b, respectively. More than one satellite 100 is beneficial to allow ground-altitude mobile terminals 20 to see at least one satellite 100a or 100b at high elevation angles and thus above nearby obstacles blocking the skyline, such as trees and buildings. Of course more than two geostationary satellites 100 could also be used. In principle, a suitably located ground station 200 can communicate with all satellites 100 if the site is chosen to give an unobstructed view down to low elevation angles.

As noted earlier, employing more than one ground station 200 imparts advantages to the satellite communications system 10. One reason is that it permits a mobile terminal signal to be connected to the PSTN as near as possible on the ground to the other party with whom the mobile terminal subscriber is in communication, thereby potentially reducing the cost of completing the connection via the PSTN. A second reason for using multiple ground stations 200 is to permit re-use of limited feeder link bandwidth several times over. For example, four to six ground stations 200 may be spaced throughout the united states to allow reuse of the feeder link spectrum thereby improving spectral efficiency.

Figure 3:
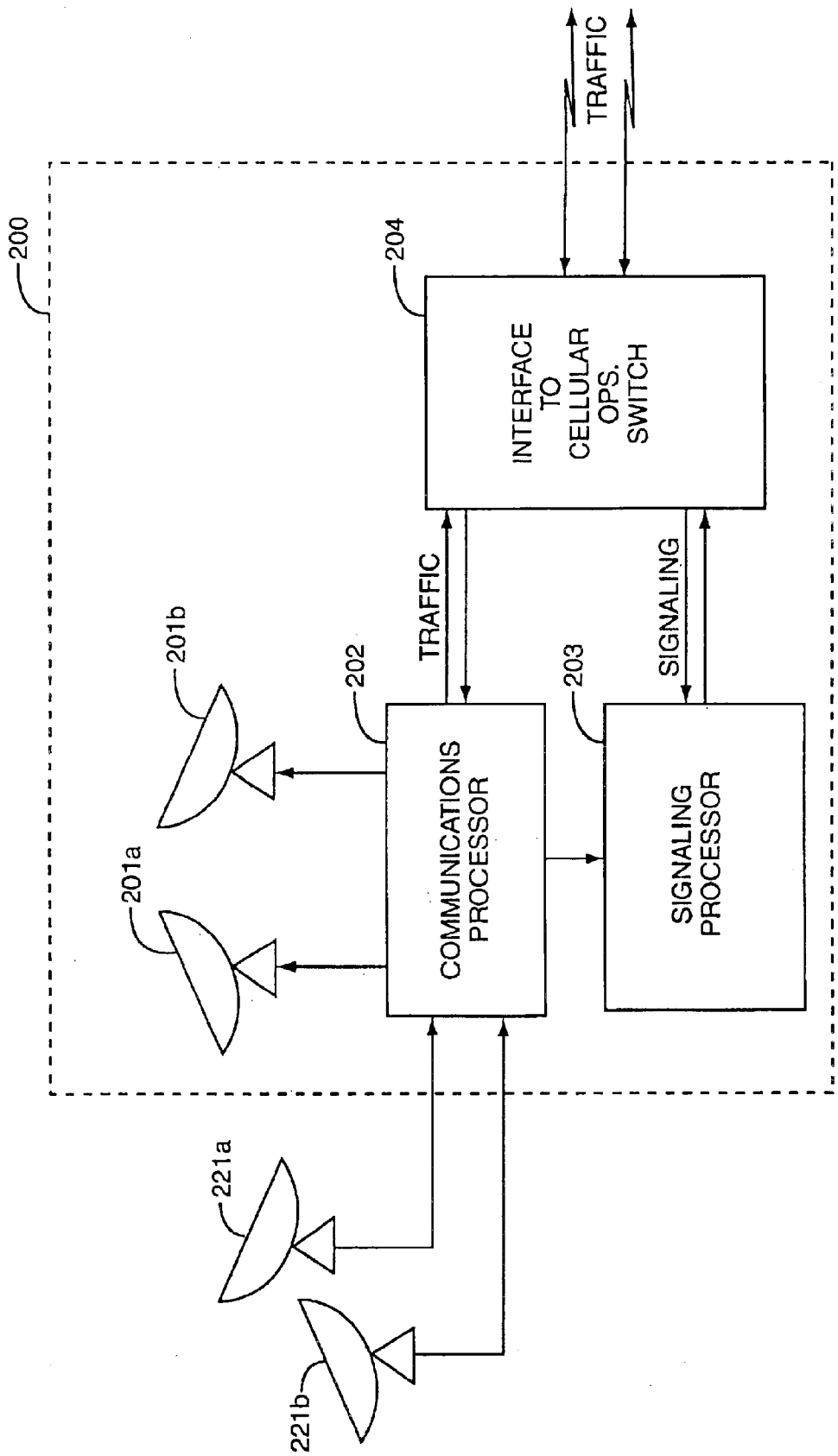
FIG. 3 illustrates the main blocks of a ground station for handling the two satellites of FIG. 2.

FIG. 3 is a block diagram showing the main components of a ground station 200. Feeder link antennae 201a, 201b are oriented toward respective satellites 100a and 10b. Feeder link antennae 201a and 201b transmit feeder link signals to respective satellites 100a and 100b in the feeder uplink frequency band F3. Feeder link receive antennae 221a and 221b receive signals from respective satellites 100a and 100b in the feeder downlink band F4. Because the antennae 201a and 201b are extremely directional, the links from ground station 200 to satellites 100a and 100b may employ the same feeder link spectrum without mutual interference. Likewise, the use of directional feeder link antennae on board satellites 100a and 100b oriented toward respective ground stations 200, combined with an adequate separation between different ground stations 200 allow the satellites 100a and 100b to discriminate signals in the same frequency band from different ground stations 200.

The ground station 200 of FIG. 3 converts signals for transmission from baseband signals to feeder link signals on antennae 201a and 201b, and converts signals received on the feeder link receive antennae 221a and 221b to baseband signals, using suitable microwave up-converters and down-converters. The baseband signals are preferably numerical signals using analog-to-digital (AtoD) converters and digital-to-analog (DtoA) converters to convert between analog and digital form. In the communications processor module 202, signals are processed using so-called layer 1 processing which can include beamforming for transmit and receive, diversity combining, modulation and demodulation, error correction coding and speech transcoding. It is appropriate for all except the latter to be performed at the antenna site. Speech transcoding can advantageously be remotely located in a pool of speech transcoders at gateways scattered around the country, the purpose of which is to maintain low bit rate speech transmission as far as possible out to the PSTN or Internet subscriber, and thereby reduce the landline transmission costs. Modulation and beamforming is further described in U.S. Pat. No. 5,909,460 entitled "Efficient apparatus for simultaneous modulation and digital beam-forming for an antenna array", which is hereby incorporated by reference herein.

Communications processor module 202 also separates decoded signals into traffic signals (speech or data) and signaling messages, and conversely combines signaling messages and traffic signals and encodes them for transmission. Communications processor module 202 passes traffic signals to an interface 204, while passing signaling messages to a signaling processor 203.

Signaling processor 203 generates signaling messages to page mobile terminals 20 that are being called by another subscriber or to command mobile terminals 20 to change frequency, timeslot or transmit power level to provide optimum quality of service. Signaling processor 203 also interprets signaling messages from the mobile terminals 20 such as requests to place a call to another subscriber, or reports of signal strength measured by mobile terminals 20 on different frequency channels (mobile assisted handover reports, or MAHO) alternatively reports of co-channel interference measured by mobile terminals 20 which may be used for mobile-assisted beamforming (MABF).

Layer 3 messages are also associated with authenticating mobile terminals 20 to exclude fraudulent attempts to obtain service without paying, as further described in U.S. Pat. No. 5,559,886, entitled "Method of carrying out an authentication check between a base station and a mobile terminal in a mobile radio system;" U.S. Pat. No. 5,390,245, entitled "Method of carrying out an authentication check between a base station and a mobile terminal in a mobile radio system;" U.S. Pat. No. 5,282,250, entitled "Method of carrying out an authentication check between a base station and a mobile terminal in a mobile radio system;" and U.S. Pat. No. 5,091,942, entitled "Authentication system for digital cellular communications," all of which are hereby incorporated by reference herein.

Layer 3 messages are also used for a mobile terminal 20 to report a change in circumstances by means of a registration, re-registration, deregistration or location update message, which are all various terms used under the general heading of "mobility management". Mobility management encompasses the techniques by which a mobile communication network keeps track of where each mobile terminal 20 is currently located, i.e. which land-based cellular base station, cell, satellite or satellite beam should be used to call a particular mobile terminal 20. The most useful satellite systems for cellular phone subscribers are dual mode systems that allow the subscriber's mobile terminal 20 to operate either in the land-based cellular system or, if a land-based system is not available, via a satellite 100. Particular techniques of dual-mode mobility management are further described in U.S. patent application Ser. No. 08/179,958 filed 11 Jan. 1994, entitled "Position Registration" which is hereby incorporated by reference herein.

Interface 204 connects the ground station 200 to the land network, such as the PSTN, which can be accessed for example through a cellular operator's mobile switching center (MSC), or via a satellite switching center, a dual-Mode satellite/Cellular switching center, or via the Internet. In the latter case, routing of the traffic may employ Internet protocol, i.e. IP routing.

Figure 4A:
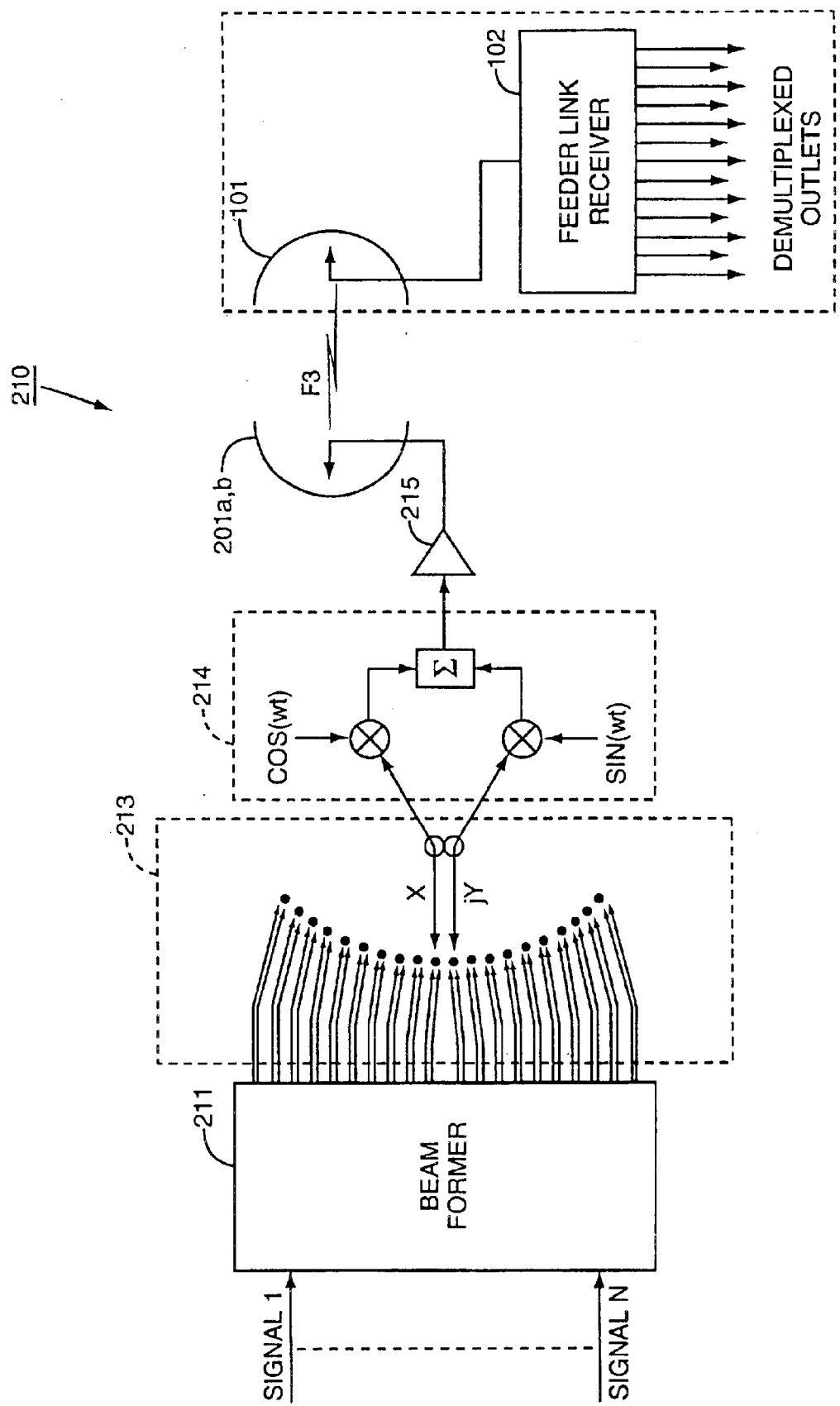
FIGS. 4A and 4B illustrate coherent feeder links ground-based beamforming for the systems of FIGS. 1 and 2.

FIG. 4A is a block diagram of a ground station transmitter 210 implementing one method of maintaining coherency in the multiplexed array element signal conveyed from the ground station 200 to the satellites 100a, 100b on the feeder uplink F3. Baseband signals (SIGNAL 1 through SIGNAL N) derived from the terrestrial network feed into beamformer 211 where they are combined to produce a set of beamformer output signals that will ultimately be used in the satellites 100a and 100b to produce the multiple transmission beams output from their multi-element antenna arrays. The output signals from beamformer 211 are time multiplexed by multiplexer 213. The multiplexed signal output from multiplexer 213 feeds into a quadrature modulator 214 for modulation up to the feeder link uplink frequency F3. The pre-amplified feeder uplink output from quadrature modulator 214 then feeds into power amplifier 215 and, from there, the amplified signal is transmitted to the satellites 100a and 100b by antennae 201a and 201b. FIG. 4A also depicts the feeder link receive antenna 101 found in satellites 100a and 100b. The signal received through the feeder link receive antenna 101 feeds into a feeder link receiver 102. The feeder link receiver 102 filters, amplifies, down-converts, and demultiplexes the signal received from the ground station 200. The demultiplexed signals output from feeder link receiver 102 are based on the output signals from ground station 200 beamformer 211.

Figure 4B:
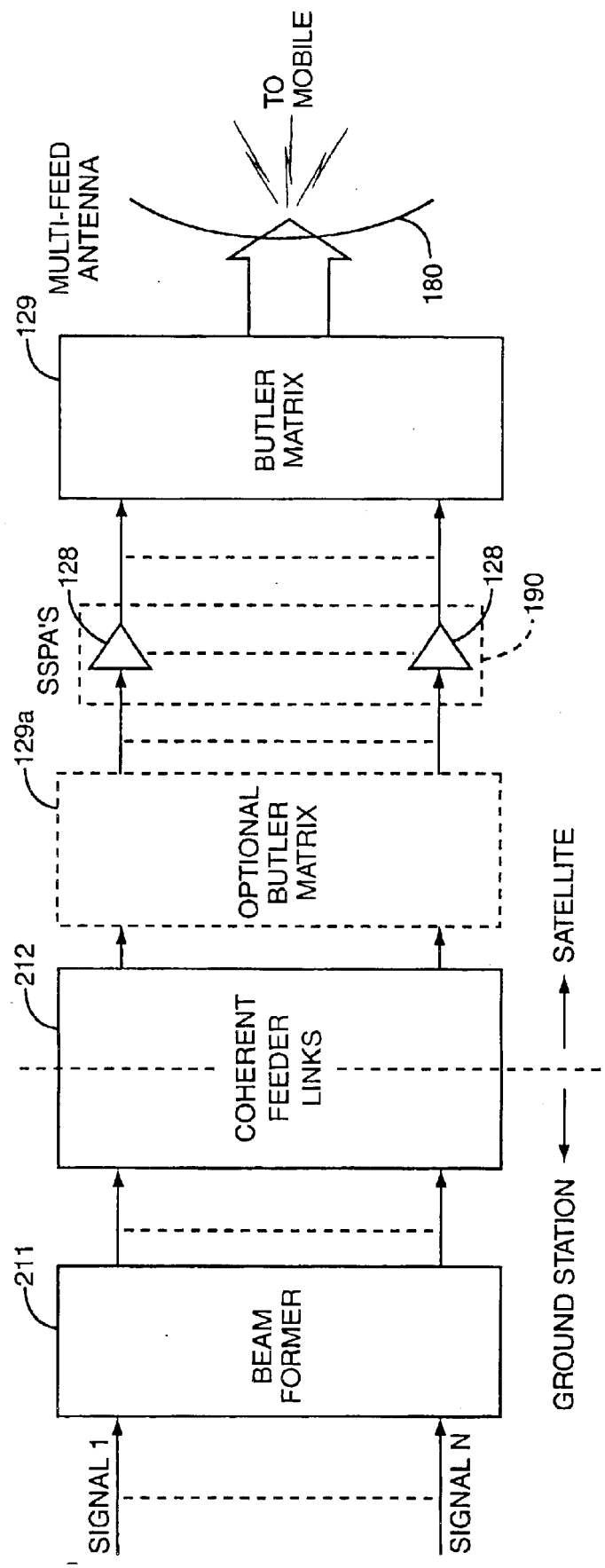

FIG. 4B illustrates one method of providing a coherent feeder link between a ground station 200 and satellites 100a/100b. FIG. 4B includes both ground and space elements. On the ground side, coherent feeder link block 212 contains the time multiplexer 213, quadrature demodulator 214, feeder link power amplifier 215, and antennae 201a/201b. On the satellite-side, coherent feeder link block 212 contains feeder link receive antenna 101 and feeder link receiver 102. The demultiplexed output signals drive a power-amplifier (PA) matrix array 190 comprised of a plurality of power amplifiers 128. The PA matrix array 190 is coupled to the multiple element antenna 180. The transmission beams output from multi-element antenna 180 provide the forward link F1 to the mobile terminals 20 in the service area covered by the beams.

As described in the incorporated references, the outputs from PA matrix array 190 may be coupled to associated phased array antenna elements, forming a so-called direct radiating array (DRA), or alternatively may be coupled to a multiple-feed reflector antenna, in which case it is advantageous to use a Butler coupling matrix 129 as first pointed out by Welti in U.S. Pat. No. 3,917,998 issued November 1975, which patent is hereby incorporated by reference herein. It can also be advantageous to locate the feed elements out of the focal plane of the reflector so that the reflector spreads energy from each point source over multiple feeds instead of focusing the energy into a single feed, which deliberate defocusing has a similar effect to the incorporation of a Butler matrix 129, and can allow the use of a Butler matrix 129 of reduced complexity and loss. The defocusing can be corrected by the ground station beamformer 211.

Figure 5:
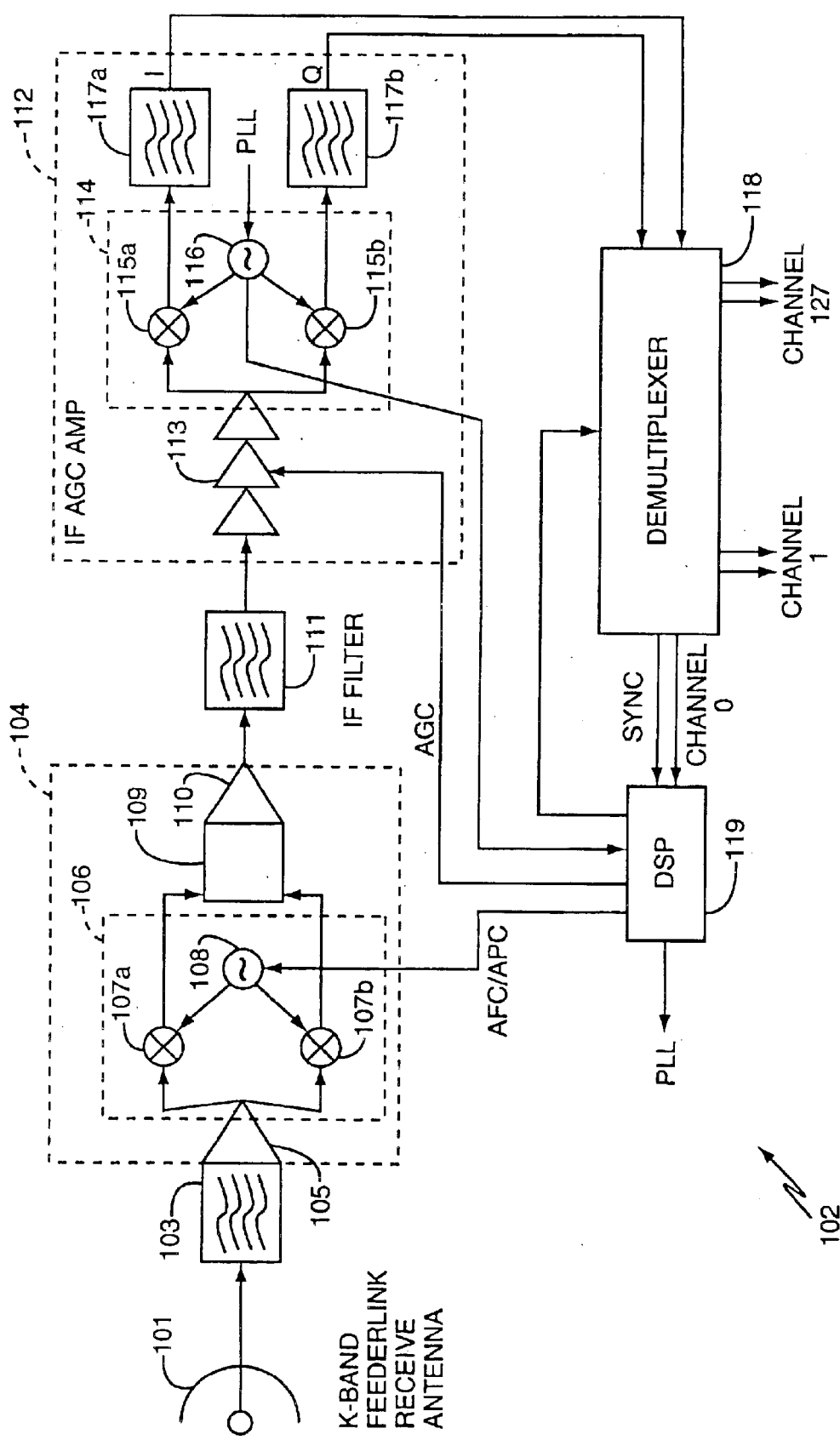
FIG. 5 illustrates a satellite feeder link receiver for receiving signals from a ground station of FIG. 1 or 2.

FIG. 5 shows the feeder link receiver 102 on board the satellites 100a, 100b. The received signal is filtered, amplified and down-converted to the quadrature baseband comprising I (In phase) and Q (Quadrature) signals which are then demultiplexed by quadrature demultiplexer 118 to separate the individual array element or PA drive signals. Signals received from feeder link receive antenna 101 are band-restricted in a feeder link band pass filter 103 and then fed to a low-noise front-end chip 104 which down-converts the received feeder link microwave signal to a suitable intermediate frequency. The front-end chip 104 may appropriately be fabricated in a Gallium Arsenide process and may include: a low-noise preamplifier 105; an image-rejection mixer 106 comprised of quadrature mixers 107a and 107b, both driven by quadrature local oscillator 108; an intermediate frequency (IF) Hilbert Network 109; and an IF buffer amplifier 110. The front-end chip 104 may, for example, down-convert signals received in K-band (20–30 GHz) to a lower IF such as 1 GHz. IF filter 111 filters the IF (i.e. 1 GHz) signal and imposes an exemplary bandwidth restriction of 208 MHz. The exemplary 208 MHz wide IF signal centered on (exemplary) 1 GHz may now be handled by a Silicon bipolar IF chip 112 including: a gain-controlled AGC amplifier 113; a quadrature down-converter 114 comprised of mixers 115a, 115b, both driven by a second quadrature local oscillator 116; and baseband low-pass filters 117a, 117b to produce the complex baseband signals I and Q. The second local oscillator 116 operates at a fixed frequency centered in the IF bandwidth and is controlled by a phase lock loop (PLL) or digital frequency synthesizer which references the frequency to an accurate master crystal. First local oscillator 108 may however be controlled simply by Automatic Frequency Control (AFC) from Digital Signal Processing (DSP) chip 119 which determines frequency error of the down-converted I, Q signals by correlating for known signal patterns included in the feeder uplink multiplexed signal.

Each of the I and Q signals has a bandwidth equal to half the total 208 MHz, and must be sampled at a Nyquist rate of at least twice their 104 MHz bandwidth—I—to avoid information loss. In the exemplary system for handling signals based on the digital cellular standard known as GSM, which is based on a 13 MHz master crystal, a sampling rate of 16×13 MHz=208 MHx is used.

The two, 208 Megasample/sec (MS/s) streams are then quadrature demultiplexed in a 128-channel demultiplexer chip 118, yielding 128 I and 128 Q demultiplexed output streams of (13 MHz)/8 or 1.625 Megasamples/sec each. One of these output streams, for example channel zero, contains known signal sequences such as 1, j, 0, 0, −1, j, −j, 0, 1 . . . or anything agreed a priori between the designers of the base station and of the satellite feeder link receiver 102. This channel is called the Sync Channel and allows DSP 119 to determine, by the presence of the known pattern, that sync has been achieved, and also to determine timing error, frequency error, and phase of the received feeder link signal. The timing error is fed back from DSP 119 to control the demultiplexing clock for demultiplexer 118 until the timing error is acceptably low, while the frequency/phase error is fed back to control first local oscillator 108 until the frequency error is zero and the phase is in a desired range. The 127 other channels of I, Q streams of 1.625 MS/s each form the array element drive signals for the forward link to the mobile terminals 20.

Figure 6:
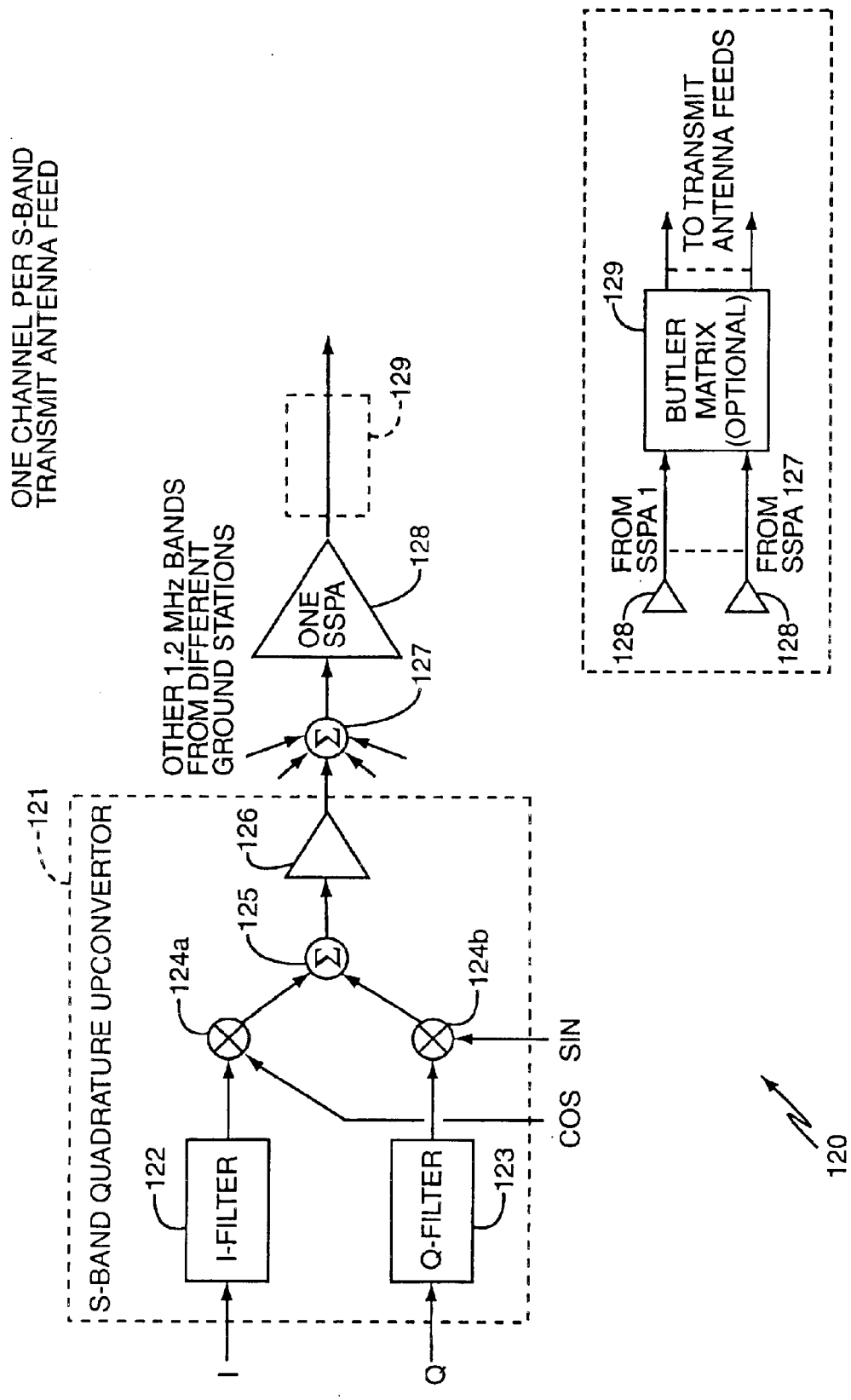
FIG. 6 illustrates one channel of forward link power amplification used in the satellites of FIG. 1 or 2 to retransmit the signals received on the feeder uplink using a multi-element transmit antenna.

FIG. 6 shows one channel 120 of forward link transmit power amplification. Each one of the demultiplexed I, Q streams from demultiplexer 118 of FIG. 5 is input to a respective amplifier channel shown in FIG. 6. The input I, Q stream is fed to a quadrature modulator or S-band up-converter 121. Up-converter 121 comprises I and Q continuous-time filters, 122 and 123, to turn the sampled I, Q data into continuous waveforms. The I, Q filters 122 and 123 are low pass filters with a cut-off less than the Nyquist bandwidth for the sampling rate. In this example, the I, Q filter pass bandwidth is 0 to 600 kHz for an I, Q sampling rate of 1.625 MS/s, which is 35% less than the Nyquist bandwidth of 812.5 kHz. This 35% margin allows filters 122 and 123 to be of a simpler design, at the expense of usable feeder link bandwidth. IF filter 111 shown in FIG. 5 which, at 208 MHz, is 35% wider than the theoretical limit of 128×2×600 kHz=153.6 MHz. The wider feeder link bandwidth is because it must be Nyquist at the 35% over sampled rate to avoid inter-sample interference between successively multiplexed samples that are intended for different antenna elements.

The continuous waveforms from filters 122 and 123 modulate cosine and sine carrier signals in balanced modulators 124a, 124b. A common cosine, sine generator (not shown) supplies all 127 modulators so that relative phase coherency is preserved. The S-band cosine/sine generator can be a programmable frequency synthesizer (PLL) which locks the S-band carrier to the master crystal and may be programmed by tele-command from the ground if ever there is a desire to change the center of the 1.2 MHz S-band bandwidth controlled by a particular ground station 200. The modulated cosine and sine carriers from balanced modulators 124a, 124b are added in adder 125 to create a complex-vector-modulated S-band signal with the complex vector value (I, Q) as determined in ground beamformer 211. The vector signal is pre-amplified in solid-state power amplifier (SSPA) 126 that serves as a driver preamplifier, and then summed in summer 127 with other similar signals on different 1.2 MHz wide S-band centers from different instances of FIG. 5 and sets of up-converters (121) associated with different ground stations 200.

The sum of all ground station signals from summer 127 then drives a linear, solid-state power amplifier (SSPA) 128. The output from SSPA 128 may be filtered to remove noise at the mobile terminal uplink (reverse link) frequency so as to avoid potentially interfering with satellite reception, using a bandstop or bandpass filter, and then the filtered signal connects to the antenna 180 using Butler matrix 129 in the case of a reflector antenna, and no Butler matrix 129 in the case of a DRA. It is desirable that each SSPA 128 amplifies a mixture of signals intended to be radiated in different directions instead of all of the signal for a single direction. This ensures that the SSPAs 128 comprising the PA block 190 are equally loaded even when the desired radiation in different directions is uneven. It also creates a "pool of transmit power" that can be diverted to any direction of radiation, unlike the case of one SSPA 128 per beam diverted to any direction of radiation, which is limited to the power of one SSPA 128 in each direction.

In a DRA, each SSPA 128 and antenna element participates in creating each beam without the need for a Butler matrix 129. However, when using a reflector antenna, beams are already at least part-formed by the reflector and feed arrangement. Thus Butler matrix 129 is used with a reflector antenna effectively to "undo" the beamforming or focusing effect of the reflector such that each SSPA 128 output signal is spread between all directions. Only when all SSPA 128 outputs are then driven in the correct phase relationship are beams reformed by causing cancellation in some directions and reinforcement in others. Moreover, this evening out of the power profile across SSPA 128 outputs also evens out the amplitude distribution across the multiplexed samples on the feeder link, so that each beam is the result of combining many samples, thus avoiding the need for high amplitude samples to create power in one direction and zero amplitude samples in directions where radiation is not intended.

Thus, unlike the above-incorporated Welti patent, while there is in the case of a reflector antenna preferably a Butler matrix 129 between the SSPAs 128 and the antenna feeds, there is no Butler matrix connecting the inputs of the SSPAs 128, as this function has been absorbed into ground beamforming 211 to provide the aforementioned advantages of evening out the dynamic range distribution across the feeder link samples. Moreover, it provides the advantage of graceful degradation in the case of failure of any channel from demultiplexer 118 to one of the up-converters 121 and an SSPA 128. This is because all beam directions can still be created using the remaining channels, albeit with slightly less precision.

If four ground stations 200 are supported, it will be realized that 4 sets of 127 up-converters 121 are needed on board each of the satellites 100a, 100b; however, in modern silicon integrated circuit technology, as used in digital cellular telephones, one such up-converter 121 occupies only on the order of a square millimeter of chip area, so that it is possible to accommodate up to perhaps 16 up-converters 121 on a single chip. This reduces the number of up-converter chips to perhaps 4×8=32, which is reasonable. Due to the fact that 127 does not divide by 16, and is in fact prime, further design considerations in a particular case might conclude that the number of antenna array element channels should for example be composite, such as 120=8×15. This would allow demultiplexer 118 to be simplified to a first stage sub-multiplexer by a factor of 16 to produce 16 demultiplexed outputs of 13 MS/s, one of which would contain sync information at this more elevated rate for DSP 119. The other 15 channel would be distributed using only 15×2 wires instead of 127×2 wires to 15 up-converter chips each containing 8 up-converters 121 connected to a second stage demultiplexer by a factor of 8.

Such an arrangement for reducing the number of interconnections by preserving an element of his the feeder link time multiplexing on internal satellite busses was described in above-incorporated U.S. patent to Applicant, No. 5,619,210.

As noted earlier, one embodiment of the present invention is to allow multiple ground stations to each control 1.2 MHz portions of the S-band spectrum in all satellite transmission beam directions. FIGS. 5 and 6 illustrate this embodiment. An alternative embodiment allows multiple ground stations 200 to each control the entire S-band spectrum but only for a subset of the satellite transmission beam directions.

To achieve the latter case, a Butler matrix 129a would be required on board the satellites 100a, 100b at the inputs of PA block 190, connecting to the SSPAs 128 to reform the beams so that they could be selected for control by different ground stations 200. In this case, it is best to select a cluster of adjacent beams to be controlled by one ground station 200 and different clusters to be controlled by different ground stations 200. The ground station beamformer 211 can then, within its cluster, fine-control the direction of radiation of any beam so as to minimize inter-beam interference within the cluster, however it no longer has enough degrees of freedom also to control interference to other neighboring clusters. Therefore it must refrain from using S-band channels in the cells on the border between clusters that are used by a neighboring cluster, which gives lower spectral efficiency than the more preferable arrangement of FIGS. 4–6.

Figure 7:
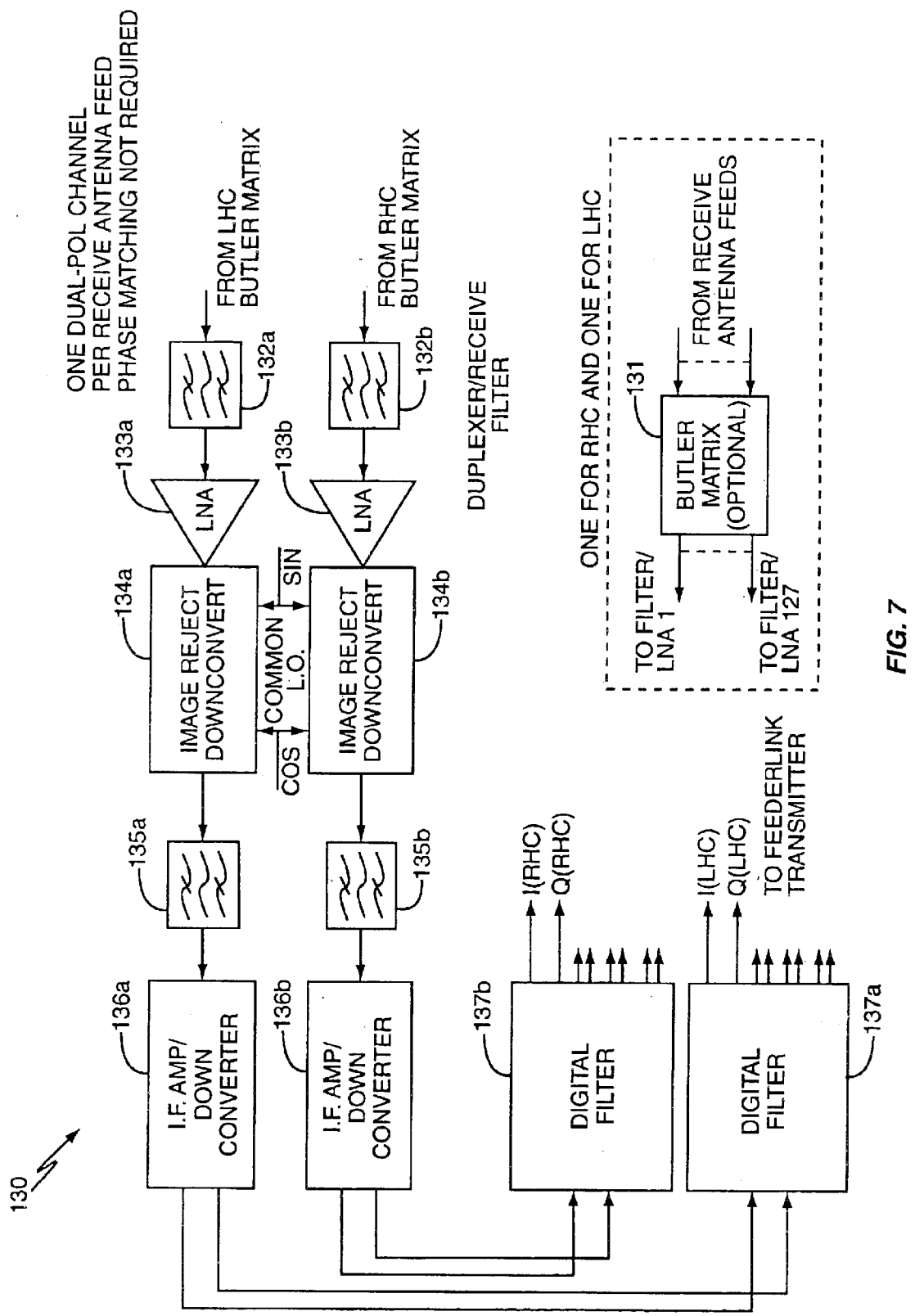
FIG. 7 illustrates a satellite transponder on board the satellites of FIG. 1 or 2 for receiving signals of arbitrary polarization from mobile terminals using a multi-element reverse link antenna.

The reverse link from the mobile terminals 20 corresponding to the forward link of In FIGS. 4–6 will now be described with the aid of FIGS. 7–11. FIG. 7 illustrates a satellite S-band receiver 130 for receiving signals from the multiple mobile terminals 20— also referred to as an "S-band transponder." FIG. 7 shows optional Butler matrices 131 for coupling the receive antenna feeds to low noise amplifiers (LNA) 133a, 133b. In this exemplary system, there are 127 filter/LNA blocks. The use of a Butler matrix 131 for reception is optional, but has the same benefits of providing a graceful degradation in the event of failure as for the forward link direction, as well as distributing each received signal over all feeder downlink samples. FIG. 7 illustrates, among other things, a dual-polarization receive capability, where received signals using one polarization are processed in components suffixed "a" while signals of the other polarization are processed in components suffixed "b". Each receive antenna feed is thus postulated to be a dual-polarization feed receiving, for example, right and left-hand circular polarization respectively—RHC and LHC. All the RHC feeds would be connected via one Butler matrix 131a, if a Butler matrix is indeed used, while all the LHC feeds would be connected via Butler matrix 131b, again, if a Butler matrix is used. Thus different antenna elements within the array may receive differently polarized signals and provide them to the matrices 131a and 131b as needed or desired.

The received signals from the antenna feeds couple through optional receive Butler matrices 131a, 131b to receive bandpass filters 132a, 132b which reject the very large interfering signal from the satellite's own forward link transmissions from the SSPAs 128. (This is illustrated in the inset box of FIG. 7.) The received forward link signals are then amplified in low-noise amplifiers (LNA) 133a, 133b and then down-converted to a suitable intermediate frequency using image rejection down-converters 134a, 134b. All 127 channels of dual-polarization and down-conversion share the same cosine and sine local oscillators so as to preserve constant relative phase and amplitude between the output IF signals. IF filters 135a and 135b impose the IF bandwidth on their output IF signals, the IF bandwidth being the bandwidth allocated to the satellite system.

In the exemplary system, a total of 9.6 MHz is divided into 4.8 MHz allocated for transmission by a first satellite 100a and 4.8 MHz for a second satellite 100b. Due to the geometric distortion of the earth's curvature, it is difficult for two satellites 100 in different locations to cover a service region with identically shaped transmission beams. Therefore, it is necessary to keep the satellite transmissions orthogonal in frequency to avoid the need for such difficult beam coordination. On the other hand, in the reverse link direction, it is useful for all satellites 100 to receive all mobile terminal signals, thus each satellite 100 receives and transponds the entire 9.6 MHz bandwidth to the ground stations 200. The band-pass filtered IF signals are IF amplified and quadrature down-converted to the complex baseband (I, Q) in IF amplifiers 136a, 136b. Assuming four ground stations 200, the 9.6 MHz bandwidth may then be decimated into eight, 1.2 MHz bandwidths, which can be numbered B1, B2 . . . B8. B1, B2, B3, B4 correspond to the 4.8 MHz served by transmissions from a first satellite 100a under the control of the four ground stations (200) 1, 2, 3 and 4. B5, B6, B7, B8 correspond to the 4.8 MHz served by transmissions from a second satellite 100b also controlled by ground stations (200) 1, 2, 3 and 4. Therefore, in the receive direction, sub-bands B1 and B5 shall be transponded to ground station 1; sub-bands B2 and B6 to ground station 2, sub-bands B3 and B7 to ground station 3 and sub-bands B4 and B8 to ground station 4. Thus the 9.6 MHz bandwidth is split into eight, 1.2 MHz sub-bands using for example digital FIR filters 137a, 137b. Dedicated digital circuits that implement a single FIR filter may be made very compact and efficient, and the eight filters for the RHC channel plus the eight filters for the LHC channel can, using today's CMOS logic, easily be accommodated on a single chip. Thus, 127 such chips would be needed, one for each dual-polarization channel.

Figure 8:
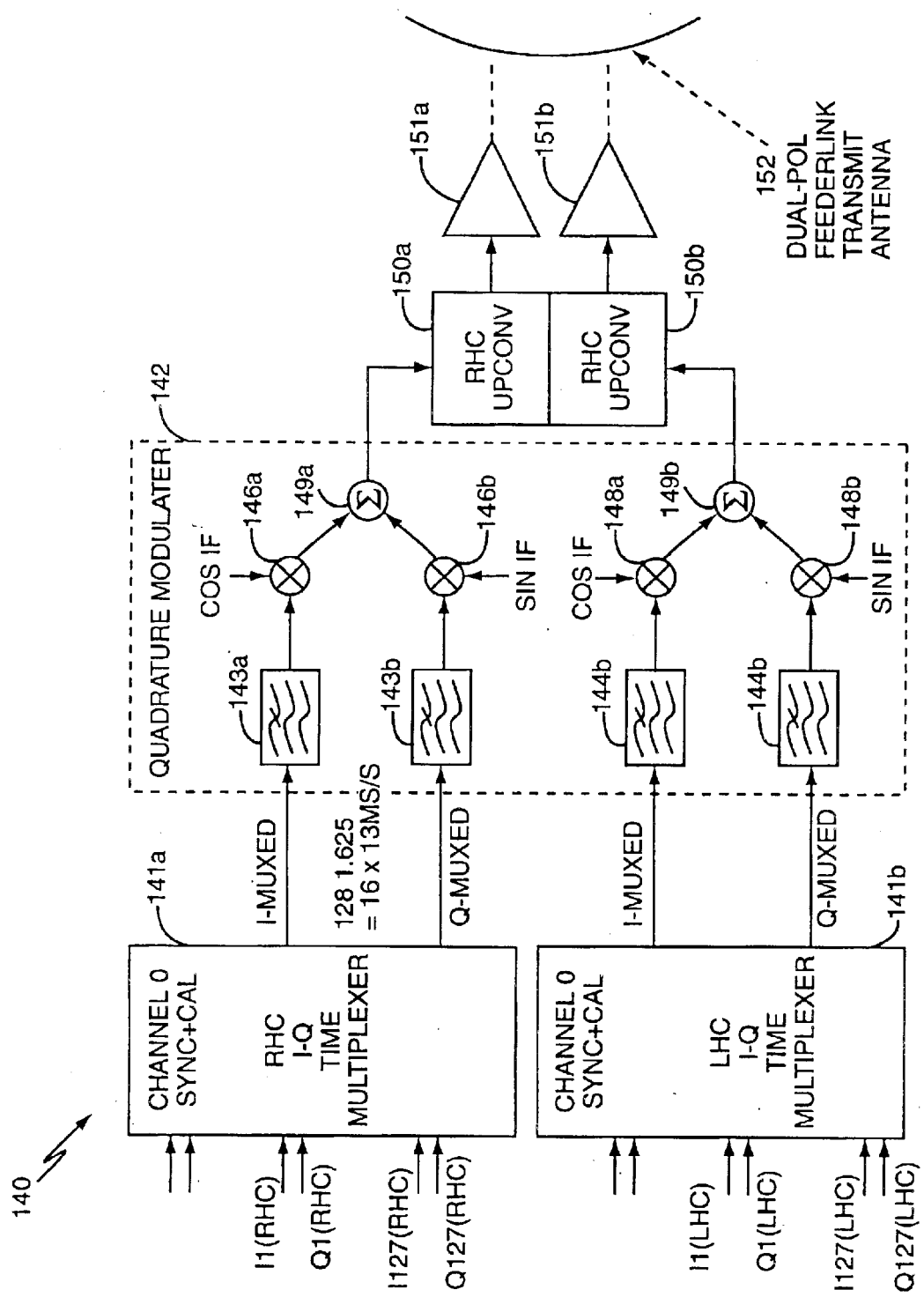
FIG. 8 illustrates a satellite transponder on board the satellites of FIG. 1 or 2 for retransmitting to a ground station the dual polarization signals received according to FIG. 7.

The digital filters 137a, 137b each output 1.625 MS/s of I and Q signals, corresponding to the 1.2 MHz bandwidth, sampled 35% over Nyquist. The 127 I, Q sample streams corresponding to the same 1.2 MHz bandwidth from all 127 antenna elements are then passed to a feeder link transmitter 140—also known as a "feeder downlink transponder"— illustrated in FIG. 8. Note that because signals are received from the mobile terminals 20 on a dual polarization, FIG. 8 illustrates two transponder channels supporting the dual polarization and the exemplary system will have such a dual-channel transponder per ground station. Referring now to FIG. 8, the 127 I, Q sample streams are collected at the time-multiplexer 141a corresponding to the RHC polarization signals and 141b corresponding to the LHC polarization signals. Each time-multiplexer 141a, 141b multiplexes the 127 antenna element signals of a corresponding polarization and sub-band with a known sample stream for sync purposes to form a 128-way multiplex at 128×1.625 MS/s=208 MS/s of I and Q. If digital filters are used for band-decimation filters 137a, 137b in FIG. 7, there is an option to use digital multiplexing for multiplexers 141a and 141b followed by high-speed DtoA conversion; alternatively, each band-decimation filter can use DtoA conversion at the 1.625 MHz rate, in which case multiplexers 141a, 141b would be analog multiplexers. Either solution is well within the current state of the art of digital logic and DtoA conversion.

The high sample rate multiplexed streams from multiplexers 141a, 141b are then converted to continuous waveforms by means of low pass filters 143a, 143b, 144a, and 144b for respectively the I and Q signals of the RHC and LHC channels. The RHC filtered I,Q waveforms are then quadrature modulated using quadrature modulator 145a, 145b using suitable cosine and sine IF carrier signals. Quadrature modulators 145a, 145b comprise quadrature mixers 146a, 146b, 147a, 147b, and adders 148a, 148b. It is simpler to construct high fidelity quadrature modulators at a lower, intermediate frequency than directly at the K-band feeder link frequency, however if suitable direct K-band modulators were developed, this would be a simplifying option. FIG. 8 assumes IF modulation followed by up-conversion of the IF signal to the feeder link frequency using up-converter 150a for RHC and 150b for LHC.

At some point in the chain, appropriately either before or after up-conversion, a second similar signal corresponding to the other 1.2 MHz sub-band that shall be transponded to the same ground station 200 shall be added, using a different 208 MHz bandwidth IF center frequency (in the case of addition prior to K-band up-conversion) or a different K-band up-conversion local oscillator in the case of addition after up-conversion to K-band. In either case, the sum of the two 1.2 MHz sub-bands is amplified by K-band transmitter 151a for RHC, typically a traveling wave tube, although solid-state devices are coming within the range of current technology, and 151b for LHC. The signals received with RHC on the reverse link and processed in the RHC channel components suffixed "a" are then transmitted by RHC polarization from the feeder link antenna 152 while the LHC received signals are transponded using the LHC port of dual-polarization feeder link transmit antenna 152. Thus, any signal polarization received on the S-band uplink (reverse link) is preserved in the feeder downlink signal (F4) to all polarization diversity combinations on the ground.

It is possible that a different allocation of bandwidth to the two satellites 100a and 100b of FIG. 2 could he used to simplify the transponder of FIGS. 7 and 8. If, instead of allocating a first contiguous 4.8 MHz to one satellite 100a and a second contiguous 4.8 MHz to a second satellite 100a, even-numbered 1.2 MHz sub-bands are allocated to the first satellite 100a and odd-numbered sub-bands to the second satellite 10b, then it becomes two adjacent sub-bands B1, B2 that have to be transponded by the reverse link transponder to the same ground station 200, instead of two non-adjacent bands such as B1, B5. This allows the two 1.2 MHz sub-bands to be treated as one 2.4 MHz sub-band, the decimation filters 137a and 137b then only splitting the total 9.6 MHz band into four, 2.4 MHz sub-bands, thus halving the number of filters required. Likewise, FIG. 8 would be modified to show multiplexing of 128, 3.25 MS/s I,Q streams instead of 1.625 MS/s streams to obtain a single 416 MHz wide K-band feeder downlink transmission instead of two, 208 MHz bandwidth feeder link transmissions, and only one feeder link transponder of FIG. 8 would be needed instead of two. This arrangement however assumes that the entire 9.6 MHz bandwidth is available from the beginning, which however may not be how regulatory authorities assign spectrum to satellite systems. Especially in the case of non-geostationary satellites that pass over many jurisdictions, a more flexible approach to spectral usage may have to be used at the expense of complexity, i.e. more filters 137a, 137b.

Figure 9:
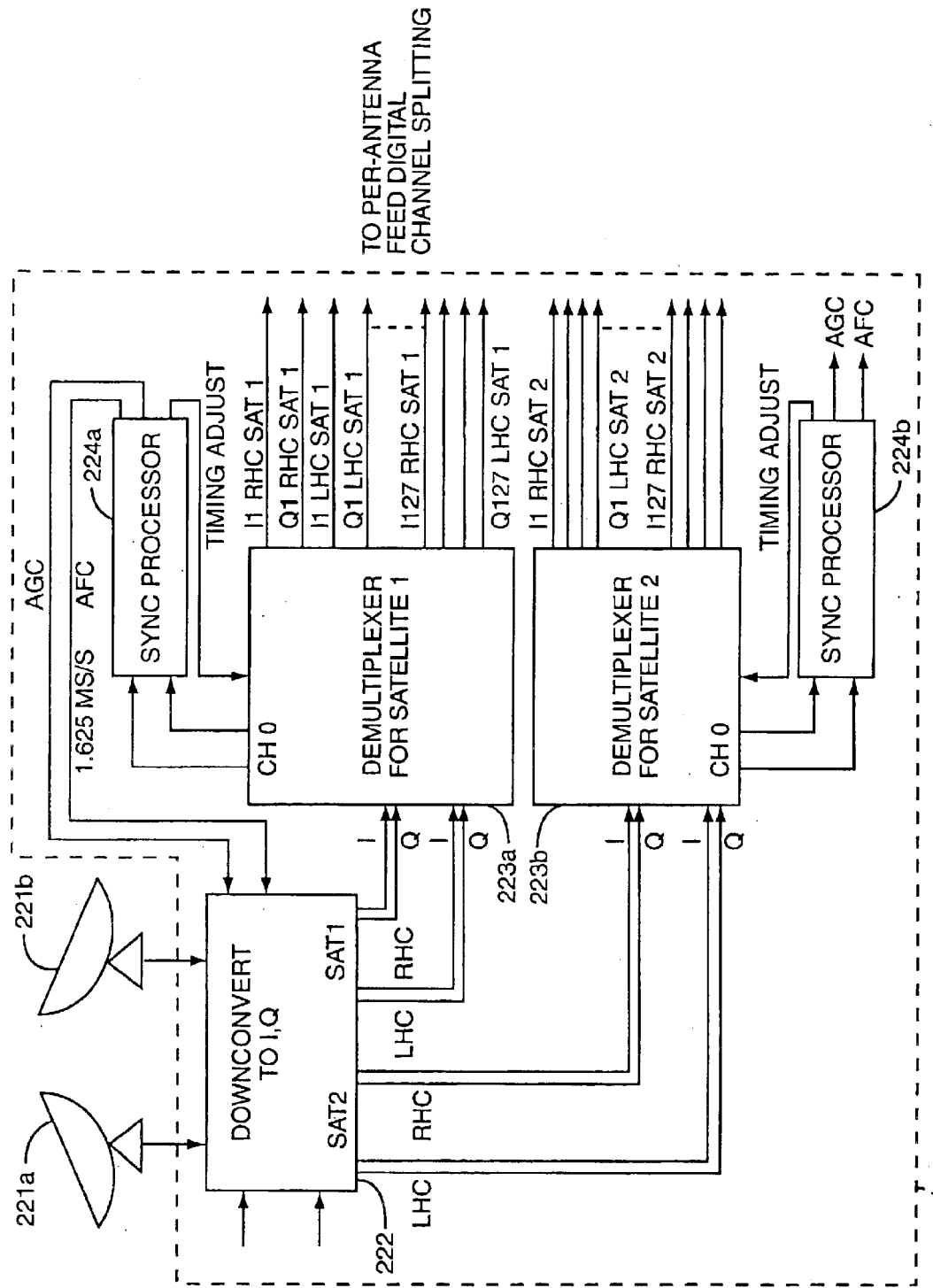
FIG. 9 illustrates the ground station processing for receiving signals from the satellite transponder of FIGS. 7 and 8 and demultiplexing the signals to obtain signals corresponding to different reverse link satellite receive antenna elements.

FIG. 9 shows the ground station reception of feeder downlink transmissions from satellites 100a and 100b, such satellite transponder transmissions illustrated in FIG. 8. FIG. 9 illustrates the arrangement for receiving only one 1.2 MHz sub-band from two satellites via ground station receiver 220. The 1.2 MHz sub-band corresponds to the 1.2 MHz sub-band of forward link transmissions from a first satellite controlled by that ground station 200, for example for a sub-band B1 transmitted from satellite 100a. There would be another, identical arrangement of the processing of FIG. 9 corresponding to the sub-band B5 controlled through satellite 100b.

Signals are received from both satellites using respectively orientated antennae 221a and 221b. The received signals are down-converted in down-converter 222 to the complex baseband comprising I and Q signals, each of bandwidth 0 to 104 MHz and for each satellite and each polarization. These 104 MHz bandwidth signals are each sampled at the Nyquist rate and then demultiplexed into 128 channels of 1.625 MS/s for each of I and Q and for each polarization in demultiplexers 223a for signals from satellite 100a and demultiplexer 223b for signals from satellite 100b. One of the 128 channels corresponding to the sync channel is extracted from demultiplexer 223a to a sync processor 224a which correlates the I, Q signals with known signals to determine timing information which is fed back to synchronize demultiplexing, and signal level information which is used to adjust the gain of receiver 220 (i.e. AGC) and also frequency error information which is used to adjust the down-conversion oscillator of down-converter 222 (i.e. AFC). Sync processor 224b does likewise for signals received from satellite 100b. The 128 streams of each of I and Q for each of RHC and LHC polarizations and each of satellites 100a and 100b are then fed to the digital channelization processors 225 of FIG. 10.

Figure 10:
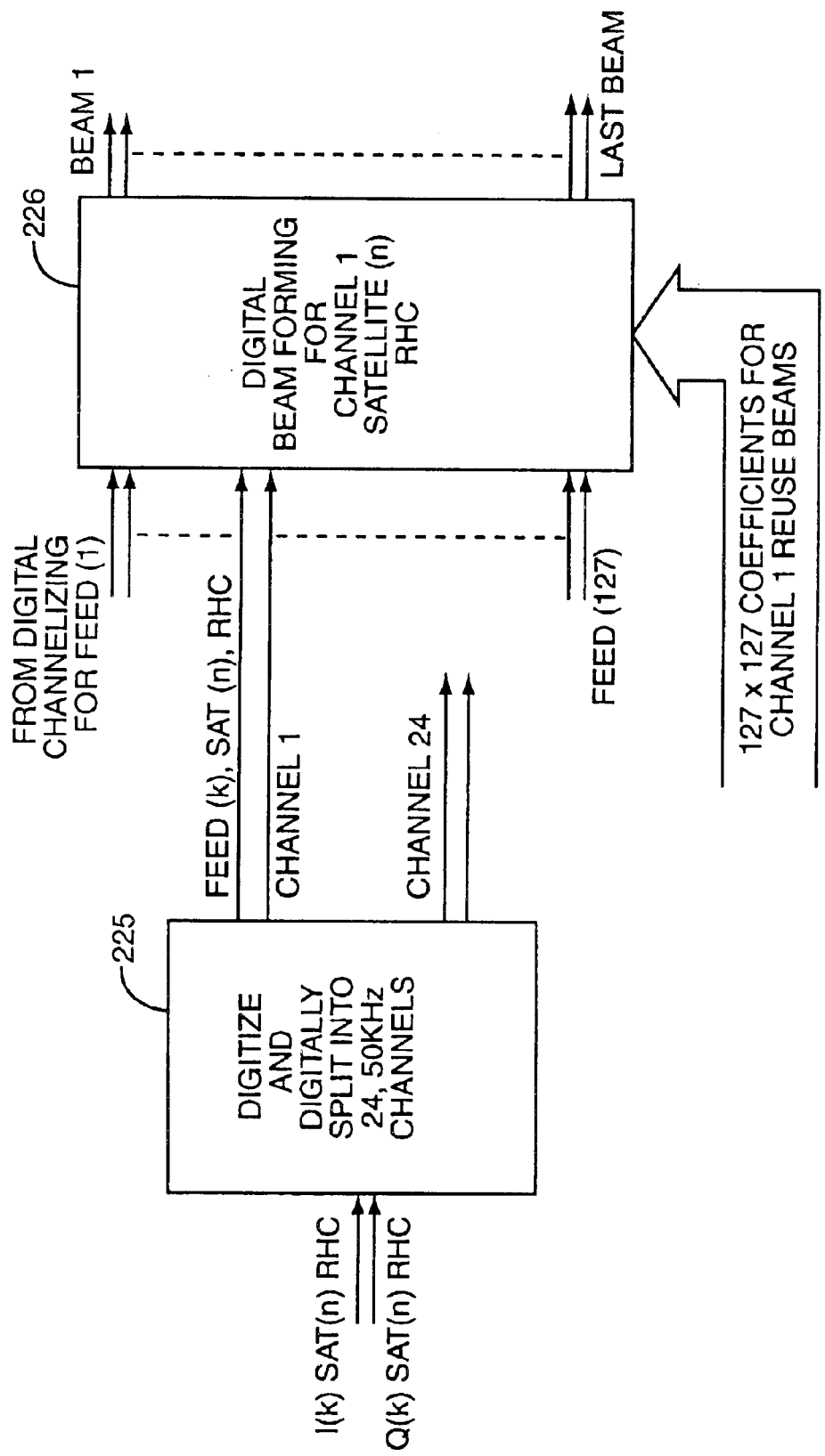
FIG. 10 illustrates digital channelization for use with the systems of FIG. 1 or 2 to divide each separated antenna element signal into a set of frequency channels, and then combining corresponding frequency channels from each antenna element using a per-channel digital beamformer to separate signals received on each frequency channel by direction-of-arrival into a number of beams.

Referring now to FIG. 10, there is one channelization processor 225 per I, Q signal pair, making 2×2×128 altogether in this exemplary system. Each channelization processor 225 splits the 1.2 MHz sub-band represented by one I, Q signal pair into twenty-four (24), 50 kHz channels. The reverse links from mobile terminals 20 to the ground stations 200 via the satellites 100a and 100b in the exemplary system use four 50 kHz channels of 4 or 8 time-division multiplex (TDMA) timeslots in correspondence to each forward link 200 kHz channel of 16 or 32 slots, in conformity with the asymmetrical access method principles espoused in U.S. Pat. Nos. 5.539,730 and 5,566,168 to Applicant entitled "TDMA/FDMA/CDMA hybrid access methods", which are hereby incorporated by reference herein. The use of wideband TDMA (200 kHz) similar to GSM is optimum for the forward link, but the $\frac{1}{16}$th or $\frac{1}{32}$nd transmit duty factor for a single mobile terminal transmitter on the reverse link is too small, leading to undesirable high peak power for a given mean power. Therefore the reverse link is scaled 4:1 in time and frequency to provide a duty factor of $\frac{1}{4}$ or $\frac{1}{8}$th for the mobile terminal transmitter.

After digital channelization in channelization processors 225, the 127 down-sampled I, Q signals from each channelization processor 225, now at a sampling rate of 13 MHz/192, and corresponding to the same 50 kHz channel, polarization and satellite are combined in digital beamformer 226 to separate the channel into up to 127 beam directions, yielding 127 separate signals. In the exemplary system, this is repeated for two satellites and both polarizations, yielding four complex signals per beam.

Figure 11:
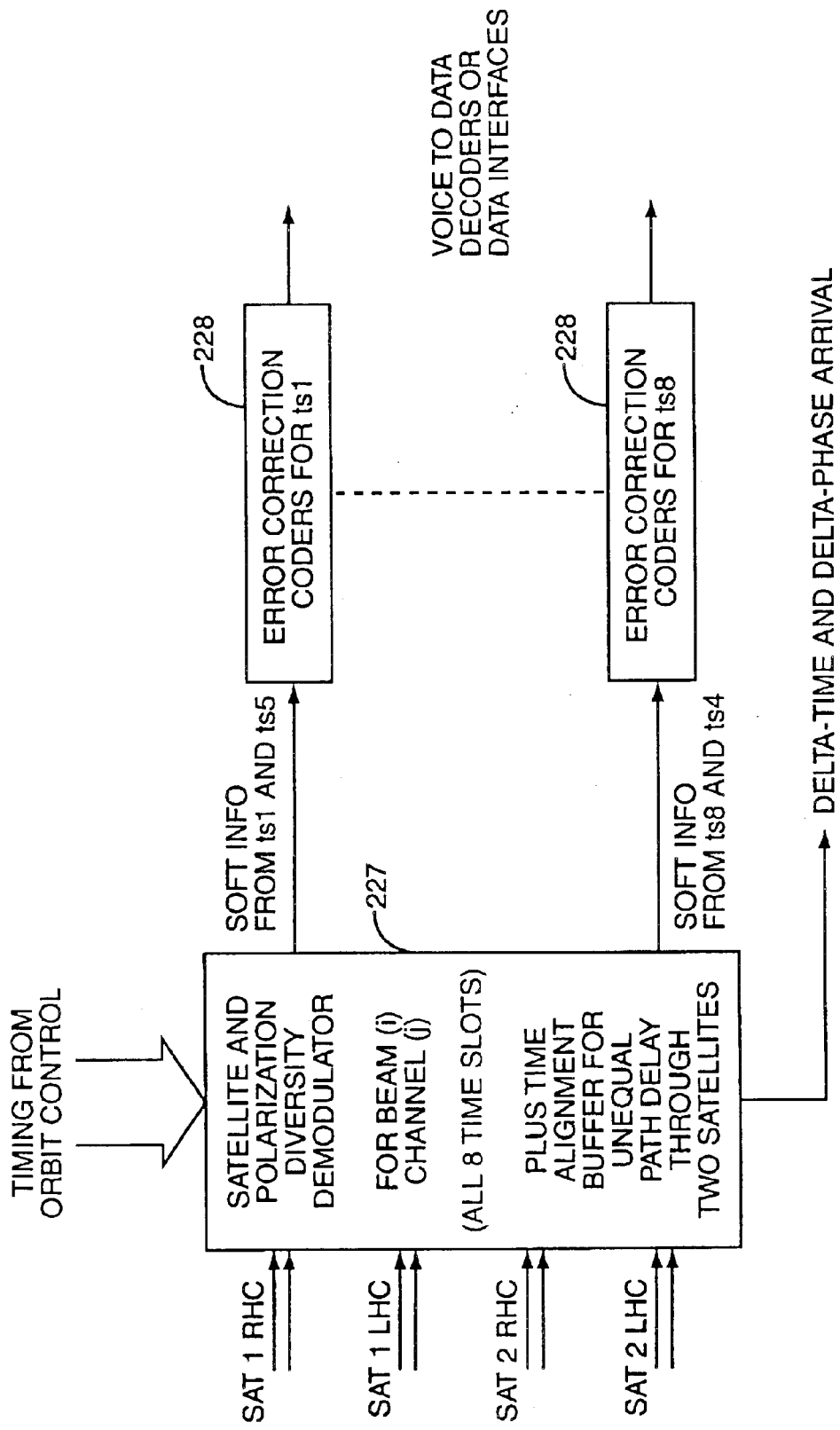
FIG. 11 illustrates a diversity demodulator for use with the systems of FIG. 1 or 2 for each channel and beam, for combining signals received on the same channel from the same mobile terminal with different polarizations and via different satellites to obtain polarization-diversity and space-diversity demodulated soft information, which is then error-correction decoded using an error correction decoder for each mobile terminal call.

Referring now to FIG. 11, the 127 different beam signals output from the digital beamformer 226 of FIG. 10 are fed into a quadruple diversity demodulator 227. Here, each of the eight TDMA timeslots per 50 kHz carrier will be demodulated to yield a separate information signal received from up to eight mobile terminals 20 per beam.

Prior to leaving discussion of FIG. 10 however, some implementation options are considered. First, to reduce the number of wires connecting channelization processor 225 to a beamformer per channel, channelization processor 225 can output one sample per 50 kHz channel successively in a 24-sample multiplexed frame at 24 times the sample rate of a single 50 kHz channel, namely (24×13 MHz)/192=(13 MHz)/8, which is the same as the 1.625 MHz an input 1, Q streams. Thus, channelization processor 225 can have only a single I, Q input of 1.625 MS/s and a single I, Q output also of 1.625 MS/s. Moreover, one digital beamformer 226 can be constructed fast enough, with no more hardware than separate beamformers, to perform beamforming for all 24, 50 kHz channels and for all 8 timeslots per channel. Each of these 192 mobile signals per beam—8 TDMA slots per channel×24 50 kHz channels per beam—are received from different directions and thus each may have a different associated set of 127 beamforming coefficients chosen to maximize the signal to noise plus interference ratio according to the formulae given in the incorporated references. The coefficients are used in a schedule in the following manner.

While receiving a set of 127 samples in parallel at beamformer 226 from 127 channelization processors 225, i.e. one sample per satellite receive antenna feed, the sample being received corresponding to a first 50 kHz channel in the postulated 24-channel time-multiplex, the 127 samples are combined by multiplication with a first 127×127 complex element matrix adapted to optimize the signals from the up to 127 mobile terminals 20 transmitting in different beams but using the same first 50 kHz channel at that instant. Then, for the next set of 127 samples corresponding to a second 50 kHz channel, a second set of 127×127 beamforming coefficients is used, and so on for all 24 channels. The 24 sets of 127×127 coefficients continue to be used cyclically until a timeslot boundary is encountered for the timing in use for at least one of the 127 different beams. This boundary need not occur at the same time in different beams, thus a timeslot shift may occur in one beam before another beam, resulting in a change to the mobile signal from a first mobile terminal 20 to a second mobile terminal 20 in a different position. The first and second mobile terminals 20 are not even restricted to being in nearby locations, so long as both their positions are compatible with the positions of other mobile terminals 20 transmitting on the same frequency as regards the ability of the antenna to separate them all by direction of arrival. When a shift from the first mobile terminal 20 to the second mobile terminal 20 transmitting occurs, preferably all 127× 127 coefficients change to re-optimize the signal to noise plus interference for every mobile terminal 20. All such coefficients can be pre-computed, however, as mobile terminal positions change very little during a 3-minute telephone call. The new set of coefficients continues to be used until another timeslot boundary in another beam is encountered, at which point another re-optimized set of coefficients is brought into use. The pattern of coefficient use must repeat however after each TDMA frame repetition period. In the worst case, there can arise the need for up to 127, 127×127 coefficient matrices for each of 8 timeslots for each of 24, 50 kHz channels, making 393 million complex coefficients altogether. However, in today's world that is only about 2–8 times the typical amount of memory available on a personal computer, the cost of which is therefore not an issue in relation to providing beamforming capacity for up to 8×24×127=24,384 phone calls.

Thus one implementation of beamformer 226 comprises a large amount of coefficient memory arranged such that sets of 127×127 coefficients can be accessed as a group, different sets of 127×127 coefficients being used cyclically just by changing the address for the coefficient set for each new sample at the sample rate of 1.625 MHz. It is emphasized that the above is the maximum possible number of coefficients that can arise, and it is possible to restrict this number to 24 sets of 127×127 coefficients by arranging that all 8 mobile calls assigned to the same 50 kHz channel and approximate beam direction can use the same set of coefficients, which requires that they lie within a certain distance of each other, typically 50 km, on the earth.

Turning again to FIG. 11, the signals separated by frequency channel and beam but still multiplexed in 8 TDMA timeslots are fed from four beamformers 226 (shown in FIG. 10) corresponding to the two satellites times two polarizations to the quadruple diversity demodulator 227. This demodulator 227 can operate, for example, according to the principle disclosed by Molnar and Bottomley in U.S. Pat. No. 5,878,093, entitled "Interference rejection combining with frequency correction", which is hereby incorporated by reference herein. The broad principles of such a demodulator are repeated here.

Each mobile transmission comprises a series of timeslots of exemplary 156.25 symbols duration, a symbol duration being 192/13 microseconds. The central 22 symbol periods in the timeslot are used to transmit a known symbol pattern, or sync-word, which is bordered by 60 data symbols to the left and to the right. The remaining 14.25 symbol periods are at the ends of the slot and comprise tail symbols, up-/down-ramping and guard time between slots. The 22 known symbols are used by the demodulator 227 for channel estimation, that is, the known symbol pattern is correlated with the four input signals at and around the expected time of occurrence of the known symbol pattern in the transmission to yield, for each of the four channels, at least three channel coefficients which may be termed C-early, C-ontime and C-late. The total of 12 channel coefficients are then used with hypotheses of the 60+60 unknown symbols made three at a time by a Viterbi Maximum Likelihood Sequence estimator to process the received signal samples pertaining to the timeslot to obtain likelihood metrics for each sequence of hypotheses. The sequence of hypothesized data symbols having a metric indicative of highest likelihood is then output as the demodulated data.

The Viterbi MSLE process preferably outputs soft symbol decisions, as for example disclosed by Hammar in U.S. Pat. No. 5,099,499 entitled "Method of generating quality factors for binary digits obtained in the Viterbi-analysis of a signal", which is hereby incorporated by reference herein. As shown in the Molnar and Bottomley patent, the channel coefficients from the four channels may be used either in a maximum ratio combining operation which maximizes signal to noise ratio, or in an interference rejection combining operation which maximizes signal to noise plus interference ratio, the latter requiring that, in addition to channel estimation, cross correlation between signals in different channels is performed to determine the correlation of the noise plus interference across the four channels. Interference rejection combining is beneficial for the postulated two-satellite system as signals that can be separated by direction of arrival at one satellite may not be totally separable at the other satellite due to the changed geometry. It is also necessary to include time-alignment buffers (delay memories) in demodulator 227 to compensate for the different propagation delay of a mobile terminal signal to each satellite 100.

Usually, a mobile terminal 20 would be timed to transmit so that the signal arrived in a designated timeslot at the principal serving satellite, i.e. at the satellite providing the forward link to that mobile terminal 20. The signal may then arrive at the other satellite in time misalignment with signals on other timeslots, causing overlap and thus interference. This can be resolved by interference rejection combining according to the foregoing method, or by the method of jointly demodulating the overlapping mobile signals using all four received signals from two satellites and both polarizations. Joint demodulation is described for example in U.S. Pat. No. 5,887,035 to Molnar entitled "Method for joint equalization and detection of multiple user signals" and U.S. Pat. No. 5,822,380 to Bottomley entitled "Apparatus and method for joint channel estimation", or, by another method described in U.S. Pat. No. 5,790,606 to Applicant entitled "Joint demodulation using spatial maximum likelihood", all of which being hereby incorporated by reference herein.

It is also described in U.S. Pat. No. 5,841,766 to Dent and Ewerbring, entitled "Diversity-oriented channel allocation in a mobile communications system" how the timeslots of a TDMA carrier may be allocated to selected mobile terminals 20 chosen such that their respective positions relative to two satellites allow TDMA timeslot alignment to be achieved at both satellites simultaneously without overlap. This involves selecting mobile terminals 20 that are located on the ground along a locus of constant delta-time delay for signals propagating to both satellites 100a, 100b to be time-multiplexed on different slots of the same 50 kHz uplink carrier. The above patent, which is hereby incorporated by reference herein, describes a heuristic algorithm for allocating a channel to a mobile terminal 20 at call set up time based on timing considerations for diversity reception as well as direction-of-arrival discrimination of the satellite antenna arrays, and essentially evaluates each choice of free channel to determine a channel and timeslot that will not result in overlapping interference at the desired reception satellite or satellites and among those selects the channel which results in the minimum satellite transmitted power, needed to support all ongoing conversations after the forward link beamforming coefficients are modified to include the new signal. The above-incorporated Dent and Ewerbring patent is also relied upon for the technique of using fixed beamforming coefficients to decide a different set of optimum reception directions for each of a number of re-used communications channels, the allocation of mobile terminals to communications channels then being performed in an optimum way at call set-up for best communication quality in each case, and possible being re-adapted after termination of each call to re-optimize quality for the ongoing communications.

After quadruple diversity demodulation or joint demodulation in demodulators 227, the soft information for timeslots 1 to 8 is output to error correction coders 228. Each error correction coder 228, in fact, receives information from two timeslots four timeslots apart in the 8-slot TDMA frame, but may not use the information from both timeslots. The TDMA uplink permits mobile terminals 20 to transmit on both slots i and |i+4|, as long as the second slot is at least temporarily unoccupied by another mobile signal and the additional mean power is required to maintain link quality. U.S. Pat. No. 5,668,837 to Applicant entitled "Dual-mode receiver for receiving narrowband and wideband signals" describes how a mobile terminal 20 can receive a first set of coded bits in a first timeslot from a first transmitter on a first frequency and then retune to receive a second set of coded bits from a second transmitter on a different (or the same) frequency, the signals then being diversity combined. U.S. patent application Ser. No. 08/501,575 to Applicant filed on Jul. 12, 1995 discloses how a convolutionally coded signal can be partitioned into a first set of coded bits that are transmitted in a first timeslot and a second set of coded bits that are conditionally transmitted in a second timeslot to enhance coding performance when needed, the signals received in the two timeslots being analyzed to determine if the bits are intended or not intended for the mobile terminal 20 in question, and then the soft decoded bits from signals classified as intended are combined by error correction decoding in a decoder (not shown) for example. The above issued patent and pending application are hereby incorporated by reference herein.

The decoders preferably always combines all soft information, however unintended soft information is "punctured", i.e. set to zero, so that it does not affect the decoded result. Thus decoders each combine soft values from two timeslots four slots apart; however, soft values from a timeslot deemed not to contain information for a particular decoder are punctured out of the demodulator output signal connected to that decoder. Use of both timeslots, when allowed and not punctured out, is called "robust mode" and allows the reverse link to be maintained though fairly deep fades caused by obstacles in the signal path. It should also be noted that error correction decoders also contain de-interleaving memory for buffering data from several successive pairs of timeslots such as ts1 and ts5, the soft values then being de-interleaved, i.e. time-reordered, prior to decoding. Thus, soft values presented sequentially for decoding may be from time slot 1 this frame, time slot 5 of the previous frame, timeslot 1 of the next frame, timeslot 5 of the current frame, and so-on. A timeslot which is punctured in one frame may not be punctured in the next, so that the actual sequence of bits for decoding may contain random puncturing due to the de-interleaving, with on average half of the bits of the second timeslot punctured and half not. On average therefore, a gain in coding rate can be achieved.

In one embodiment, each satellite 100 has only a single instance of feeder uplink transponder (FIG. 5) and feeder downlink transponder (FIG. 8). The single feeder link receiver 102 (FIG. 5) is adapted to receive the overlapping sum of all ground station signals, and a single feeder link transmitter (FIG. 8) to transmit to all ground stations 200. In the latter case, all eight 1.2 MHz sub-bands are transponded as one, wideband feeder link multiplex signal, now of bandwidth 13 MHz×128=1.664 GHz. It may not be practical to obtain such an amount of feeder link spectrum, so this implementation may be restricted to cases where the number of antenna array elements or feeds is somewhat less than 127, or where the total allocated reverse link S-band spectrum is less than 9.6 MHz, or both. For example, using 63 antenna feeds and 4.8 MHz of S-band spectrum gives a feeder downlink requirement of 416 MHz, which is reasonable. Thus, apart from making such adjustments to the scaling, FIG. 8 does not change significantly. The beam width of antenna 152 must be wide enough to encompass all ground station locations, which reduces its gain, and that must be compensated by either higher power from amplifiers 151a and 151b, or by using larger diameter ground station antennae 201a and 201b (FIG. 3) 221a, 221b or of FIG. 9.

In one embodiment, the operation of the feeder link receiver 102 (FIG. 5) must be considered when receiving the sum of multiple ground station 200 signals. Assuming first and second ground stations 200 for illustration, it is necessary to time align the transmissions from the two ground stations 200 such that a time-multiplexed signal sample from the first ground station 200 destined for satellite antenna element number k (k=1 to 127) is received at the satellite 100 exactly on top of the signal sample for satellite antenna element k from the second ground station 200. If the signals from the different ground stations are so synchronized, their complex values merely add in space at feeder link receive antenna 101 (FIG. 5). Likewise, the known synchronizing signal samples transmitted from each ground station 200 would also add.

To achieve such synchronization between ground stations 200, it is necessary to provide continuous feedback to each ground station 200 to inform it whether it is early or late in its timing. Thus the satellite receive timing may be designated the master timing and fixed. Instead of DSP 119 providing a time correction to the demulitplexer 118, the demultiplexer 118 operates with a fixed master timing, and DSP 119 provides a time correction back to each ground station 200 instead. The onus is thus on the ground stations 200 to transmit with a timing that will be received as desired at the satellite 100.

In order for DSP 119 to be able to distinguish the separate timing of multiple ground stations 200 from their respective synchronization samples, it is proposed that the synchronization sample sequence should constitute an orthogonal code, and that different ground stations 200 should then use different orthogonal codes. Orthogonal codes have the property that one orthogonal code has zero correlation with another orthogonal code when correctly time-aligned, as they will be after an initial start-up phase. The Walsh-Hadamard codes are examples of a set of orthogonal codes that could be used, based on only sequences of +/−1 values. In the present invention, ternary codes having every alternate symbol equal to +/−j and with those in between forming a Walsh code using +/−1 are considered. The inclusion of zero values in half of the real parts when the symbol is +/−j and half the imaginary parts when the symbol is +/−1 allows DC offset of quadrature down-converter 114 to be determined by DSP 119 by averaging the values that are supposed to-be zero, and then correcting the DC offset by subtracting the average.

Pure Walsh codes may also be used, and if Walsh code number zero is excluded, they have equal numbers of +1 and −1 that also allow DC offset to be determined by averaging. DC offset on the 127 array element samples may be corrected in a different way if desired, namely by subtracting a DC offset value digitally in the ground based beamformer, which value is determined by using mobile terminal 20 to report signal measurements related to DC offset along with the MABF reports mentioned earlier.

If a DRA is used, the different array elements may be phased such that a constant DC offset on all I, Q samples from quadrature down-converter 114 produces a beam of radiation at an oblique angle which misses the earth. In the case of a reflector array, it can be arranged that DC offset accumulates as a radiated signal from a peripheral antenna feed, corresponding for example to illumination of the Pacific Ocean somewhere off the West coast of the USA or of the Atlantic off the East Coast.

Thus, DSP 119 can be adapted to correlate the demultiplexed sync channel samples with all of the ground station orthogonal codes and to determine timing error, frequency error and phase error. A constant phase error is irrelevant, as it is common to all array element signals and does not therefore affect their relative phases. A varying phase error manifests itself as a frequency error (rate of change of phase=frequency error) and should be corrected if too great. A given ground station 200 should however be able accurately to predict satellite motion relative to itself which is the cause of Doppler frequency error, and to be able to pre-compensate its transmitted frequency by dead reckoning, i.e. open loop. The ground station 200 may indeed determine the Doppler shift from the feeder downlink signal and correct its feeder uplink transmission frequency accordingly. The timing error measured by DSP 119 must however be reported to each ground station 200, even if the ground station 200 uses the measured Doppler shift to pre-compensate timing drift, to avoid accumulating increasing timing errors. The measured timing errors may thus be used to modulate a signal multiplexed with the downlink sync+cal channel shown applied to channel (0) of multiplexers 141a and 141b of FIG. 8.

It is likely that a simple early/late bit for each ground station would suffice to permit each ground station 200 to adjust its timing, based on the received early/late bits, to align with the now fixed satellite demultiplexer 118 timing. Other telemetry information may be multiplexed with the sync+cal information transmitted and, conversely, telecommands may be modulated on to or multiplexed with the sync+cal signals received from the ground stations 200. Such modulation or multiplexing can, for example, be by inverting or not inverting the orthogonal sync+cal sequence assigned to a ground station 200, thus conveying a sequence of binary 1's and 0's which would be decoded in a telecommand decoder. The satellites 100 can be so constructed so as to demodulate and decode the telecommand signal using only a designated one of the orthogonal sequences, thus determining that the ground station 200 using that sequence is the master. If it were desired to use a different ground station 200 as the master, it would swap orthogonal codes with the old master station and the satellite would now decode telecommand information transmitted by the new master station, thus providing redundancy for the ground control station.

Once feeder link signals from different ground stations 200 have been time-aligned as described above, the linearity of the transponder ensures that the beams and signals created by the sum of signals from different ground station beamformers 211 are just the ensemble of the beams and signals aimed to be created by those beamformers 211. Of course, no two beamformers 211 should aim to create overlapping beams on the same frequency channel at the same time, which now presupposes a method to assign control of certain frequencies and timeslots in certain directions to a given beamformer 211. The simplest method is to assign different frequencies to be controlled by different beamformers 211, however, the number of frequencies assigned may now be dynamically varied as the traffic shifts from one ground station 200 to another. The present invention can work cooperatively with a management system (not illustrated) providing intelligent traffic management that optimizes the handling and routing of individual mobile terminal calls.

The need to shift traffic from one ground station 200 to another arises not necessarily for technical reasons, but for regulatory reasons when, for example, a satellite system is shared across multiple administrations, such as Mexico, the USA and Canada. Regulations may require that traffic originating and terminating in the same territory be handled by a ground station 200 located in that territory. Other areas of the world produce even more complicated regulatory issues, requiring division of traffic between ground stations 200 for non-technical reasons. These requirements can be met by the implementation just described. The inventive implementation can also result in some simplification of the satellite hardware; for example, band decimation filters 137a, 137b of FIG. 7 may disappear if it is not desired to split the frequency band in a fixed manner between different ground stations 200. The time synchronization accuracy of the ground stations 200 to the satellite 100 must be ideally somewhat less than one multiplex sample, perhaps less than 1 ns error. However, particular assignment of samples to SSPAs 128 on-board the satellite can result in far lower sensitivity to timing-error than others.

Indeed, in another novel aspect of the present invention, consider for the moment that there is no sync channel, with all 128 signals being array element signals. Further, assume that the optional Butler matrix 129 of FIG. 4B is present. With these assumptions, imagine that timing slips one whole sample period, so that SSPA 2 receives the drive signal intended for SSPA 1; SSPA 3 receives that intended for SSPA 2, and so on. (With wrap-around, SSPA 1 receives the drive signal intended for SSPA 128.) The application of signals to Butler matrix 129 is thus merely rotated one place. Since the Butler matrix 129 performs a Fourier transform, and the Fourier transform components of a cyclic signal shifted one sample in time are just changed in phase by 0 degrees (for output 1), 2 Pi/128 (for output 2); 4 Pi/128 (for output 3) and so-on, it can be seen that the signals applied to the antenna feeds are merely changed in phase.

If adjacent outputs of the Butler matrix 129, which will be in error by only a few times 2 Pi/128 in relative phase, drive adjacent antenna feeds, the desired beam formed by a cluster of adjacent antenna feeds will barely be affected at all, even by the postulated gross timing error of one whole multiplex sample period. The same principle applies when using other Butler matrix 129 and multiplex formats, such as the 8×15 multiplex for 120 antenna elements, which may be coupled with 8, 15+15-port Butler matrices 129. Even when an 8×16 multiplex is used, with one out of 16 samples devoted to the sync channel, the principle of insensitivity to timing error still applies, especially when the timing error is much less than the one whole sample postulated. Thus, properly ordering the outputs from the SSPAs 128 to the optional Butler matrix 129 imparts significant insensitivity to timing errors.

In the same way, sensitivity to inter-sample interference (ISI) due to filter 111+filters 117a, 117b being non-Nyquist, is not so great as may have been thought when this optimum assignment of multiplex channels to Butler matrix ports is made. This results because ISI from a previous sample is equivalent to a time-shifted signal, which however only produces a phase change to the signals at the Butler matrix outputs, plus an amount of interference from the sync channel that is somewhat attenuated. Indeed, it is realized that the effect of the Butler matrix is to transform the impulse response of the feeder uplink to a "frequency response," which however, instead of weighting the signal spectrum, applies the weighting function across the outputs to the antenna feeds. This may be compensated at the ground-based beamformer 211 by applying the inverse of the weighting function to the signals that ideally should be radiated by the feeds. Alternatively, a time-domain pre-equalizer may be used to alter the samples before transmission to compensate for ISI in transmission over the feeder link, thus relieving the satellite 100 of this difficult job.

In the light of the above, it is interesting to speculate that a simple satellite 100 using a multiple-feed reflector antenna and no beamforming, i.e. one feed per beam, can use a time multiplexed feeder link to convey signals for the different feeds from a ground station 200 to the satellite 100, the time-multiplexing system needing no synchronization and thus no synchronization channel. A mis-synchronization by any whole number m of samples would then merely rotate the phase of the signal out of Butler matrix 129 to feed(n) by the constant amount 2 Pi/N, which has no effect on the receivability of the signal by a mobile terminal 20. A mis-synchronization by a whole number of samples plus half a sample on the other hand applies a root-raised-cosine weighting to the Butler matrix 129 output amplitudes, whereby half of them are at less than half the desired power level. If the time-multiplexed signal is however oversampled at, for example, twice the sample rate to obtain double the number of demultiplexed outputs from demultiplexer 118, and these are used to drive double the number SSPAs 128 connected to an overdimensioned Butler matrix 129, only half of the outputs of which are connected to respective antenna feeds, then a variation of power in a feed with fractional mis-sampling can be alleviated.

Thus a time-multiplexed feeder link can be built that does not require synchronization between the multiplexer and the demultiplexer. Only a systematic timing drift, which would cause a rate-of-change of phase, equivalent to a frequency error, would be perceived. A drift of one sample per second would cause a frequency error of zero Hz in one beam, 1/N Hz in another beam, 2/N Hz in a third beam, and so on up to a maximum of (N−1/N) Hz, nearly 1 Hz. Therefore sampling frequency error translates directly to a worst case frequency error of the same amount, and thus if the mobile terminals 20 can accept a frequency error of 100 Hz, it suffices that the demultiplexing sample rate be equal to the multiplexing sample rate within an accuracy of 100 Hz, which is not practically challenging. This principle may also be extended to a system employing beamforming that requires co-phasing of several feeds, by simply applying a frequency correction corresponding to the multiplexing frequency error scaled by n/N for feed number n, thus eliminating the need for a synchronization channel. Another useful variation comprises using, for example, eight, 16-way multiplexed signals each of ⅛th the sample rate, and all synchronized together. One of the 16. Multiplexed channels at one of the multiplexers and a corresponding multiplexer may be devoted to a synchronization channel, if needed, for all of the multiplexers and demultiplexers, thus providing 7 subgroups of 16 coherent channels and one subgroup of 15 coherent channels for driving 127 SSPAs or antenna elements where coherency is only needed between the subgroups.

Obviously, the tremendous flexibility and complexity of the present invention combine to provide significant opportunity for variation. Indeed, a person skilled in the art may make many such variations to the exemplary parameters detailed in the foregoing discussion without departing from the spirit and scope of the present invention as defined by the claims herein.

That which is claimed is:

1. A communications satellite system for providing communications between a plurality of mobile terminals and a satellite ground station, said system comprising:

at least one orbiting satellite comprising a satellite dual-polarization receiving antenna, said satellite dual-polarization receiving antenna comprising multiple satellite antenna elements that receive first and second polarized signals from said plurality of mobile terminals, wherein said first polarized signals correspond to a first one of said dual polarizations and said second polarized signals correspond to a second one of said dual polarizations;

a first transponder on board said satellite that processes said first polarized signals received from said mobile terminals to convert said first polarized signals to a first feeder link signal for transmission to said satellite ground station using a first feeder link polarization;

a second transponder on board said satellite that processes said second polarized signals received from said mobile terminals to convert said second polarized signals to a second feeder link signal for transmission to said satellite ground station using a second feeder link polarization;

a ground-station dual-polarization receiving antenna at said satellite ground station that receives said first and second feeder link signals, said ground-station dual polarization receiving antenna comprising multiple ground-station antenna elements that receive said first and second feeder link signals from said satellite;

a dual-channel receiver connected to said ground-station dual-polarization receiving antenna that amplifies, filters, downconverts, and digitizes the received first and second feeder link signals to produce numerical sample streams corresponding to said received first and second feeder link signals received at each of said multiple satellite antenna elements and each of said dual-polarizations; and a diversity demodulator connected to said dual channel receiver that combines said numerical samples streams to reproduce information transmitted by said plurality of mobile terminals.

2. The system of claim 1 wherein said satellite dual polarization receiving antenna is a Direct Radiating Array comprised of dual-polarization array elements.

3. The system of claim 1 wherein said satellite dual polarization receiving antenna comprises multiple dual-polarization antenna feed elements and a reflector.

4. The system of claim 3 wherein said multiple dual-polarizaton antenna feed elements are located out of the focal plane of said reflector.

5. The system of claim 3 wherein said multiple dual-polarization antenna feed elements are coupled using a Butler matrix.

6. The system of claim 4 wherein selected subgroups of said multiple dual-polarization antenna feed elements are coupled using Butler matrices of reduced complexity.

7. The system of claim 1 wherein said first and second transponders downconvert received signals from each of said multiple satellite antenna elements to the complex baseband to obtain corresponding In-phase (I) and Quadrature (Q) signals.

8. The system of claim 7 wherein said first and second transponders each use quadrature time-division multiplexing to multiplex said (I,Q) signals corresponding to the same polarization of different antenna elements to obtain a first and a second feeder link baseband signals.

9. The system of claim 8 wherein said first feeder link baseband signal is upconverted to a first feeder link frequency to obtain said first feeder link signal and said second feeder link baseband signal is upconverted to a second feeder link frequency to obtain said second feeder link baseband signal.

10. The system of claim 9 wherein said first and second feeder link frequencies are the same frequency.

11. The system of claim 1 wherein said numerical sample streams at said ground station comprise complex numerical samples having a real (Inphase or I) part sample stream and an imaginary (Quadrature or Q) part sample stream.

12. The system of claim 11 wherein said dual channel receiver uses quadrature time-division demultiplexing to demultiplex the signal from each channel to thereby obtain said complex (I, Q) numerical sample streams.

13. The system of claim 1 wherein said diversity demodulator combines said numerical samples streams using beamforming controlled by a number of complex beamforming coefficients.

14. The system of claim 13 wherein the number of said beamforming coefficients used at any instant is equal to the product of the number of said numerical sample streams times the number of signals from said plurality of mobile terminals received on the same frequency channel at said at least one orbiting satellite at said any instant.

15. The system of claim 13 further comprising a beamformer and beamforming coefficients corresponding to each of said dual polarizations.

16. The system of claim 13 wherein said beamforming coefficients optimize demodulation of information from each of said plurality of mobile terminals independently.

17. The system of claim 15 further comprising a separate demodulator for each signal simultaneously received on a given frequency channel from said plurality of mobile terminals that further combines outputs from said beamformers to decode information from one of said plurality of mobile terminals.

18. The system of claim 17 wherein said separate demodulator uses combining coefficients estimated with the aid of known symbols included in transmissions from said plurality of mobile terminals.

19. The system of claim 13 wherein said beamforming coefficients are fixed and correspond to optimizing reception from a set of fixed directions.

20. The system of claim 16 wherein said beamforming coefficients are fixed and correspond to optimizing reception from a number of fixed directions, and said plurality of mobile terminals are allocated to use a set of said beamforming coefficients corresponding to optimum reception from the direction in which each of said plurality of mobile terminals location most closely corresponds.

21. The system of claim 1 wherein said diversity demodulator comprises a separate demodulator and decoder for each signal received simultaneously on a given frequency channel from said plurality of mobile terminals.

22. The system of claim 21 wherein each of said separate demodulators jointly process information received in a timeslot allocated to one of said plurality of mobile terminals together with Information received in a timeslot which is allocated to the same one of said plurality of mobile terminal in some TDMA frames and to a different one of said plurality of mobile terminals in other TDMA frames.

23. The system of claim 1 wherein said diversity demodulator combines samples corresponding to different satellite antenna elements, different polarizations, and different timeslots using weighting coefficients to optimize decoding of information received from each of said plurality of mobile terminals.

24. The system of claim 1 wherein said diversity demodulator is adapted to perform digital channel splitting to separate each of said numerical sample streams into numerical sample streams of reduced sample rate, each numerical sample stream of reduced rate corresponding to one of a number of frequency channels.

25. The system of claim 24 wherein said diversity demodulator further is adapted to perform digital beamforming for each of said frequency channels to combine ones of said numerical sample streams of reduced sample rate corresponding to the same frequency channel.

26. A communications satellite system for providing communications between a plurality of mobile terminals and a satellite ground station, said system comprising:

at least two orbiting satellites each comprising a multi-element, dual-polarization receiving antenna comprising multiple satellite antenna elements that receive signals from said plurality of mobile terminals, each of said satellites having a dual-channel transponder that transponds signals received by each of said multiple satellite antenna elements so as to preserve relative phase and amplitude between signals from different satellite antenna elements of the same satellite;

at least one ground station comprising at least two receiving antennas each said receiving antenna being orientated toward a corresponding one of said at least two satellites to receive transponded signals transmitted from said corresponding satellite to said ground station;

a diversity receiver at said at least one ground station for jointly processing transponded signals transmitted from said at least two satellites and received by said at least two receiving antennas to decode information transmitted by said mobile communications terminals.

27. The system of claim 26 wherein said multi-element satellite antennas for each of said orbiting satellites are Direct Radiating Arrays comprised of dual-polarization array elements.

28. The system of claim 26 wherein said multi-element satellite antennas for each of said orbiting satellites comprise multiple dual-polarization antenna feed elements and a reflector.

29. The system of claim 28 wherein respective ones of said multiple dual-polarization antenna feed elements are located out of the focal plane of said reflector.

30. The system of claim 28 wherein respective ones of said multiple dual-polarization antenna feed elements are coupled using a Butler matrix.

31. The system of claim 29 wherein selected subgroups of each of said multiple dual-polarization antenna feed elements are coupled using Butler matrices of reduced complexity.

32. The system of claim 26 wherein each of said dual channel transponders uses quadrature time division multiplexing to preserve relative phase and amplitude between signals from different satellite antenna elements of the same satellite.

33. The system of claim 26 wherein said diversity receiver comprises:

a plurality of demultiplexers for separating signals received from each satellite into separate signals corresponding to different satellite antenna elements; and a plurality of channelizers for further separating each of said separated signals by frequency channel to obtain channelized signals.

34. The system of claim 33 further comprising a plurality of beamformers for each of said frequency channels to combine ones of said channelized signals corresponding to the same frequency channel to obtain beamformed signals.

35. The system of claim 34 further comprising a plurality of diversity demodulators for combining ones of said beamformed signals corresponding to the same frequency channel and beam direction but different satellites to decode information transmitted by said mobile communications terminals.

* * * * *